(12) United States Patent
Peltz et al.

(10) Patent No.: US 8,880,314 B2
(45) Date of Patent: Nov. 4, 2014

(54) BRAKE MONITORING SYSTEMS AND METHODS

(71) Applicant: General Electric Company, Schenectady, NY (US)

(72) Inventors: David Michael Peltz, Melbourne, FL (US); Brian Joseph McManus, Ft. Worth, TX (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 13/676,172

(22) Filed: Nov. 14, 2012

(65) Prior Publication Data

US 2014/0136068 A1    May 15, 2014

(51) Int. Cl.
*B60T 17/22*    (2006.01)
(52) U.S. Cl.
CPC ..................................... *B60T 17/22* (2013.01)
USPC .............................................. 701/70; 303/15
(58) Field of Classification Search
USPC .............................................. 701/70; 303/15
See application file for complete search history.

(56) References Cited

U.S. PATENT DOCUMENTS

| | | | |
|---|---|---|---|
| 4,440,015 A * | 4/1984 | Hann | 73/39 |
| 5,405,182 A * | 4/1995 | Ewe et al. | 303/15 |
| 6,213,565 B1 * | 4/2001 | Hart | 303/7 |
| 2011/0118899 A1 * | 5/2011 | Brooks et al. | 701/2 |

* cited by examiner

*Primary Examiner* — Mary Cheung
*Assistant Examiner* — Michael Berns
(74) *Attorney, Agent, or Firm* — GE Global Patent Operation; John A. Kramer

(57) ABSTRACT

An air brake monitoring system includes an air brake control module and an air brake monitoring module. The air brake control module is configured to control variation of an amount of pressure in a brake pipe of the vehicle to actuate brakes of a braking system of the vehicle. The air brake monitoring module is configured to obtain a reference replenishment volume corresponding to a volume of air used to recharge the braking system after application of the brakes of the braking system when the braking system when a first amount of brakes are operational, to obtain an actual replenishment volume corresponding to an actual volume of air used to recharge the braking system of the vehicle after a braking activity performed by the vehicle, and to generate a signal based on a comparison of the actual replenishment volume to the reference replenishment volume.

42 Claims, 4 Drawing Sheets

BRAKE MONITORING SYSTEMS AND METHODS

FIELD

Embodiments of the subject matter described herein relate to brake monitoring systems and methods for vehicles.

BACKGROUND

A vehicle, such as a train, may use different types of brakes for stopping or slowing the vehicle. For example, a train having a plurality of cars may have a regenerative (or dynamic) braking system on powered units, and may also have an air brake system on some or all of the non-powered and powered units. The air brake system may provide air from one or more generally large reservoirs to generally smaller individual reservoirs associated with a piston for actuating one or more brake shoes against one or more wheels. While the regenerative braking system may be used more often than the air brake system, the air brake system may be intended to be employed during emergency situations or when supplemental braking in addition to the regenerative braking system is needed (for example, on a steep grade). Thus, it is important that the air brake system work properly when called upon.

However, air brake systems may be subject to numerous modes of failure, especially in the conditions encountered by traveling vehicles. For example, couplings used in an air circuit (such as to connect portions of a brake pipe for supplying air to the individual pistons and associated reservoirs) may fail, cylinders may become stuck and not actuate properly, and the like. If enough failures occur throughout the system, then an insufficient amount of air braking capability may be present at an emergency.

U.S. federal regulations thus require periodic checking of the effectiveness of the air brake system of trains. For example, an initial inspection may be required at the beginning of a mission. To perform the initial inspection, the air brake system is actuated, and an operator walks the length of the train to confirm that all brakes are operational, and/or to address any brakes that are not operational. Then, the train is stopped at periodic points (e.g., every 1,000 miles or 1,600 kilometers) along its mission, and an operator again walks the length of the train to confirm that all of the air brakes remain operational, and/or address any non-functioning air brakes. The stopping of the train and inspection of the brakes is a time consuming operation, adding to the time and expense of missions, particularly longer missions that may require multiple stops and brake inspections. As conventional air brakes do not provide feedback regarding their operational status during performance of a mission, the train is stopped and visually inspected by an operator to verify the operational status of the individual brakes.

Certain air brake systems use electronic controls that are able to communicate with a central processor onboard a vehicle. Current U.S. federal regulations allow for waivers of the 1,000 mile inspection rule for trains with electronic monitoring of air brakes through electronic polling of cars equipped with electronic controls for air brakes. For example, if 85% of brakes remain in communication with the central processor, then the 1,000 mile inspection is waived. Such electronic controls, however, have several drawbacks. For example, certain individual brakes may be able to communicate with the central processor but not be functional. Further, electronic control systems may be quite expensive.

A need exists for cost-effective and accurate monitoring of brake systems without requiring visual inspection during a stop.

BRIEF DESCRIPTION

In one embodiment, a system includes an air brake control module and an air brake monitoring module. As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

The air brake control module is configured to be disposed onboard a vehicle, and to control variation of an amount of pressure in a brake pipe of the vehicle responsive to an input. The variation of the amount of pressure in the brake pipe is configured to actuate brakes of a braking system of the vehicle. The air brake monitoring module is configured to be disposed onboard the vehicle. The air brake monitoring module is configured to obtain a reference replenishment volume corresponding to a volume of air that recharges the braking system of the vehicle after application of the brakes of the braking system when a first amount of brakes are operational. The air brake monitoring module is also configured to obtain an actual replenishment volume corresponding to an actual volume of air used to recharge the braking system of the vehicle after a braking activity performed by the vehicle. The air brake monitoring module is further configured to generate a signal based on a comparison of the actual replenishment volume to the reference replenishment volume.

In another embodiment, a method includes obtaining, at a processing unit disposed onboard a vehicle, a reference replenishment volume corresponding to a volume of air used to recharge a braking system of the vehicle if a first amount of brakes of the vehicle are operational. (Obtaining a volume may be understood as including, for example, determining a volume using information from a detector or sensor, or, as another example, receiving a volume previously determined by another processing unit.) The method also includes obtaining, at the processing unit, an actual replenishment volume corresponding to an actual volume of air used to recharge the braking system of the vehicle after a braking activity performed by the vehicle. The actual replenishment volume corresponds to information obtained by one or more detection units disposed on-board the vehicle. The method further includes generating a signal, at the processing unit, based on a comparison of the reference replenishment volume and the actual replenishment volume.

In another embodiment, a tangible and non-transitory computer readable medium includes one or more computer software modules configured to direct a processor to obtain a reference replenishment volume corresponding to a volume of air used to recharge a braking system of a vehicle if a first amount of brakes of the vehicle are operational. The computer readable medium is further configured to direct the processor to obtain an actual replenishment volume corresponding to an actual volume of air used to recharge the braking system of the vehicle after a braking activity performed by the vehicle.

The actual replenishment volume corresponds to information obtained by one or more detection units disposed on-board the vehicle. The computer readable medium is further configured to direct processor to generate a signal based on a comparison of the reference replenishment volume and the actual replenishment volume.

In another embodiment, a vehicle system (e.g., for monitoring air brakes) includes an air brake control module, an air flow detector, and an air brake monitoring module. The air brake control module is disposed onboard the vehicle system. The air brake control module is configured to control variation of an amount of pressure in a brake pipe of the vehicle system responsive to an input or command, wherein the variation of the amount of pressure in the brake pipe is configured to actuate brakes of a braking system of the vehicle system. The air flow detector is disposed onboard the vehicle system and operably connected with the brake pipe of the vehicle system. The air flow detector is configured to measure air flow through the brake pipe, and may include a high precision mass flow meter. The air brake monitoring module is configured to be disposed onboard the vehicle system. The air brake monitoring module is configured to obtain a reference replenishment volume corresponding to a volume of air that recharges the braking system of the vehicle system when a first amount of brakes are operational, to obtain an actual replenishment volume corresponding to an actual volume of air used to recharge the braking system of the vehicle system after a braking activity performed by the vehicle system, and to generate a signal based on a comparison of the actual replenishment volume to the reference replenishment volume. The air brake monitoring module is configured to use air flow information provided by the air flow detector to obtain the actual replenishment volume.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
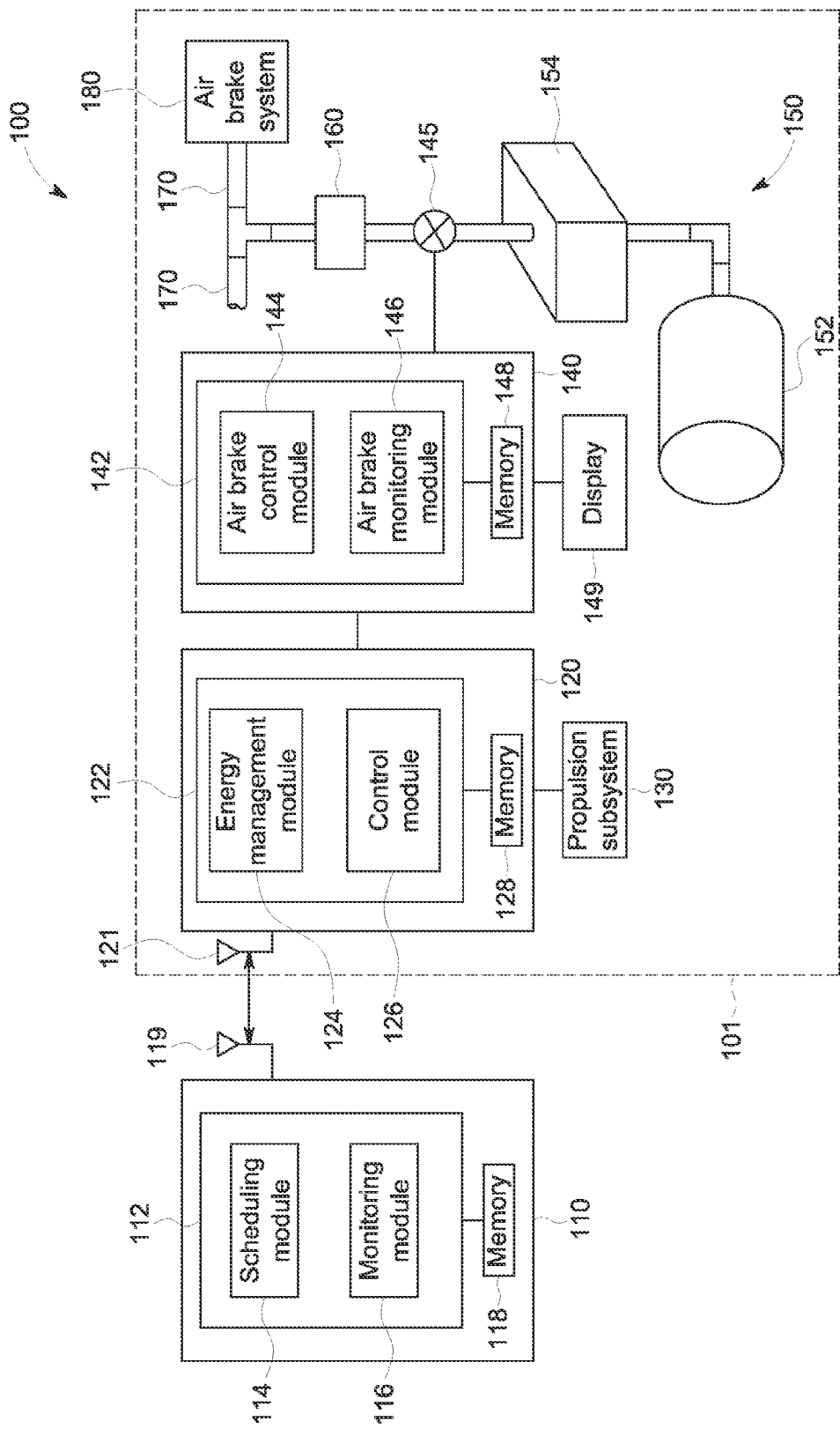
FIG. 1 is a schematic diagram of one embodiment of a braking and control system.

One or more embodiments of the inventive subject matter described herein provide systems and/or methods for monitoring air brakes of a vehicle system. For example, embodiments use precision air flow meters and associated processing units and software to measure the flow of air during a recharging of an air brake system, and to determine a replenishment volume of air for the recharging, such as by integrating a measured or determined amount of flow rate. This replenishment volume may be compared to a reference replenishment volume measured and determined during an initial (e.g., previous) test braking application. Lower replenishment volume indicates a higher percentage of individual brakes that did not use their reservoir of available air (and thus those reservoirs were not required to be recharged), thereby indicating malfunction(s) of a portion of the air braking system. Further, the shape of the recharge flow curve may be used to determine a characteristic of the recharge, and may be used additionally or alternatively to the change in replenishment volume to determine an effectiveness of an air brake system.

A technical effect of embodiments includes improvement in safety, for example, by providing for improved monitoring of effectiveness of air braking systems. An additional technical effect of embodiments includes improvement in monitoring of air brakes without requiring a stop of a vehicle and/or a visual inspection. An additional technical effect of embodiments includes reduced cost of monitoring air brake systems.

Throughout this document, the term vehicle consist is used. A vehicle consist is a group of two or more vehicles that are mechanically coupled to travel together along a route. A vehicle consist may have one or more propulsion-generating units (e.g., vehicles capable of generating propulsive force, which also are referred to as propulsion units) in succession and connected together so as to provide motoring and/or braking capability for the vehicle consist. The propulsion units may be connected together with no other vehicles or cars between the propulsion units. One example of a vehicle consist is a locomotive consist that includes locomotives as the propulsion units. Other vehicles may be used instead of or in addition to locomotives to form the vehicle consist. A vehicle consist can also include non-propulsion generating units, such as where two or more propulsion units are connected with each other by a non-propulsion unit, such as a rail car, passenger car, or other vehicle that cannot generate propulsive force to propel the vehicle consist. A larger vehicle consist, such as a train, can have sub-consists. Specifically, there can be a lead consist (of propulsion units), and one or more remote consists (of propulsion units), such as midway in a line of cars and another remote consist at the end of the train. The vehicle consist may have a lead propulsion unit and a trail or remote propulsion unit. The terms "lead," "trail," and "remote" are used to indicate which of the propulsion units control operations of other propulsion units, and which propulsion units are controlled by other propulsion units, regardless of locations within the vehicle consist. For example, a lead propulsion unit can control the operations of the trail or remote propulsion units, even though the lead propulsion unit may or may not be disposed at a front or leading end of the vehicle consist along a direction of travel. A vehicle consist can be configured for distributed power operation, wherein throttle and braking commands are relayed from the lead propulsion unit to the remote propulsion units by a radio link or physical cable. Toward this end, the term vehicle consist should be not be considered a limiting factor when discussing multiple propulsion units within the same vehicle consist.

FIG. 1 provides a schematic diagram of one embodiment of a braking and control system 100 for a vehicle 101. The vehicle 101 in some embodiments includes a consist. For example, the vehicle 101 may be a train including powered units (e.g., locomotives) and non-powered units. The braking and control system 100 includes a scheduling system 110, a control system 120, a propulsion subsystem 130, an air brake monitoring system 140, an air supply module 150, an air flow detector 160, and an air brake system 180 operably connected to the air supply module 150 via a brake pipe 170.

The scheduling system 110, which may be disposed off-board of the vehicle 101, may provide a schedule to the control system 120 (as well as to one or more other vehicles), with the control system 120 configured to develop a trip plan using the schedule. The trip plan may include, for example, one or more air braking activities to be performed by the air brake system 180. (The trip plan may also include one or more tractive operations to be performed by one or more propulsion units of a consist, as well as one or more braking activities to be performed by a braking system or systems other than the air brake system 180, such as a dynamic braking system (not shown).) The air brake monitoring system 140 controls the application of the air brake system 180, as well as monitors the performance or available braking capability of the air brake system 180. The air supply module 150 provides air to the air brake system 180 via the brake pipe 170. In the illustrated embodiment, air in the brake pipe 170 is used both to supply the air brake system 180 and to control the air brake system 180. For example, a given variation in the pressure of air within the brake pipe 170 may act as a control signal directing a given application of the air brake system 180. The air brake monitoring system 140 may be configured to determine a percentage of the braking capability of the air brake system 180 available for a braking activity. In some embodiments, the air brake monitoring system 140 may be configured to determine if the available braking capability of the air brake system 180 exceeds a threshold, for example if the available braking capability of the air brake system 180 meets or exceeds about 85% of a reference braking capability of the air brake system 180. The reference braking capability may be understood, for example, as the braking capability of the air brake system 180 when all brakes of the air brake system 180 are operational.

A movement plan for the vehicle 101 may be determined by the scheduling system 110. As shown in FIG. 1, the scheduling system 110 can be disposed off-board (e.g., outside) of the vehicle 101. For example, the scheduling system 110 may be disposed at a central dispatch office for a railroad company. The scheduling system 110 can create and communicate the schedule to the vehicle 101. The scheduling system 110 can include a wireless antenna 119 (and associated transceiving equipment), such as a radio frequency (RF) or cellular antenna, that wirelessly transmits the schedules to the vehicle 101. For example, the scheduling system 110 may transmit destination locations and associated arrival times to the vehicles 101.

The control system 120 is configured to examine the schedule, such as by determining the scheduled destination location and scheduled arrival time, and to generate control signals based on the schedule. The control signals may be used to automatically control tractive efforts and/or braking efforts of the vehicle 101 such that the vehicle 101 self-propels along to a destination location. For example, the control system 120 may be operatively coupled with a propulsion subsystem 130 of the vehicle 101. The propulsion subsystem 130 may include motors (such as traction motors), engines, brakes (such as air brakes (e.g., air brake system 180 may be considered a sub-system of the propulsion subsystem 130) and/or regenerative brakes), and the like, that generate tractive energy to propel the vehicle 101 and/or slow movement of the vehicle 101. The control system 120 may generate control signals that automatically control the propulsion subsystem 130, such as by automatically changing throttle settings and/or brake settings of the propulsion subsystem 130. (Self-propulsion includes automatic operation under the purview of an operator, who may have the option to take over manual control of the vehicle.)

In another embodiment, the control signals may be used to prompt an operator of the vehicle 101 to manually control the tractive efforts and/or braking efforts of the vehicle 101. For example, the control system 120 may include an output device, such as a computer monitor, touchscreen, acoustic speaker, or the like, that generates visual and/or audible instructions based on the control signals. The instructions may direct the operator to manually change throttle settings and/or brake settings of the propulsion subsystem 130.

The control system 120, for example, utilizes information available to the control system 120 as part of controlling the tractive and braking efforts of a powered unit or consist or as part of generating a trip plan. For example, the control system 120 may have access to positional or distributional information regarding the consist. Such distributional or positional information may include, for example, the location of each powered unit in the consist, the location of a lead powered unit, the location of a trail powered unit, or the location or type of each non-powered vehicle in the consist, and the distribution of weight generally along the length of the consist. The control system may additionally have access to route information regarding the route over which the consist is traveling. Such route information may include, for example, the location and curvature of curves along the route, the location of crossings and switches along the route, the location and slope of grades along the route, an identification of speed or other limits along the route, or an identification of areas along the route subject to construction and related limitations on the operation of the consist in such areas. In some embodiments, the control system 120 obtains information from the scheduling system 110. Such information may include the timing of when other consists may be traveling along the same route currently being traveled by the consist, weather conditions, route conditions encountered or reported by other consists, and progress or status of construction at construction areas along the route.

The scheduling system 110 includes a controller 112, such as a computer processor or other logic-based device that performs operations based on one or more sets of instructions (e.g., software). The instructions on which the controller 112 operates may be stored on a tangible and non-transitory (e.g., not a transient signal) computer readable storage medium, such as a memory 118. The memory 118 may include one or more computer hard drives, flash drives, RAM, ROM, EEPROM, and the like. Alternatively, one or more of the sets of instructions that direct operations of the controller 112 may be hard-wired into the logic of the controller 112, such as by being hard-wired logic formed in the hardware of the controller 112.

The scheduling system 110 includes several modules that perform various operations described herein. The modules are shown as being included in the controller 112. As described above, the modules may include hardware and/or software systems that operate to perform one or more functions, such as the controller 112 and one or more sets of instructions. Alternatively, one or more of the modules may include a controller that is separate from the controller 112. While the scheduling system 110 is shown in FIG. 1 as communicating with a single control system 120, in some embodiments, the scheduling system 110 can concurrently communicate with two or more control systems 120 disposed on-board two or more different (e.g., not mechanically coupled with each other) vehicles or consists.

The scheduling system 110 includes a scheduling module 114 that creates schedules for one or more vehicles or consists traveling in a network. In one embodiment, the scheduling module 114 controls communication between the scheduling system 110 and the vehicles or consists. For example, the scheduling module 114 may be operatively coupled with the antenna 119 to permit the scheduling module 114 to control transmission of data (e.g., schedules) to the vehicle 101 and to receive data (e.g., trip plans, amounts of fuel carried by the vehicle 101, results of air brake monitoring determinations or measurements, or the like) from the vehicle 101. Alternatively, another module or the controller 112 may be operatively coupled with the antenna 119 to control communication with the vehicle 101.

The scheduling module 114 creates schedules for one or more vehicles traveling in a network. The scheduling module 114 can form the movement plan for a network that coordinates the schedules of the various vehicles traveling in the transportation network. For example, the scheduling module 114 may generate schedules for the vehicles that are based on each other so that a throughput parameter of the transportation network remains above a threshold.

The scheduling system 110 includes a monitoring module 116 in the illustrated embodiment. The monitoring module 116 can monitor travel of vehicles in a transportation network. The vehicles may periodically report current positions to the scheduling system 110 so that the monitoring module 116 can track where the vehicles are located. Alternatively, signals or other sensors disposed alongside routes of a transportation network may periodically report the passing of vehicles by a signals or sensors to the scheduling system 110. The monitoring module 116 receives the locations of the vehicles in order to monitor where the vehicles are in the transportation network over time.

The scheduling module 114 creates a schedule for the vehicles 101 and transmits the schedule to the control system 120 of the vehicle 101. In one embodiment, the scheduling module 114 may modify a previously created schedule that previously was sent to the vehicle 101. The scheduling module 114 may convey the schedules to the antenna 119, which transmits the schedules to the antenna 121 of the control system 120 of the vehicle 101.

The control system 120 of the vehicle 101 receives the schedule sent by the scheduling system 110. In the illustrated embodiment, the control system 120 includes a controller 122, such as a computer processor or other logic-based device that performs operations based on one or more sets of instructions (e.g., software). The instructions on which the controller 122 operates may be stored on a tangible and non-transitory (e.g., not a transient signal) computer readable storage medium, such as a memory 128. The memory 128 may include one or more computer hard drives, flash drives, RAM, ROM, EEPROM, and the like. Alternatively, one or more of the sets of instructions that direct operations of the controller 122 may be hard-wired into the logic of the controller 122, such as by being hard-wired logic formed in the hardware of the controller 122.

The control system 120 includes several modules that perform various operations described herein. The modules are shown as being included in the controller 122. As described above, the modules may include hardware and/or software systems that operate to perform one or more functions, such as the controller 122 and one or more sets of instructions. Alternatively, one or more of the modules may include a controller that is separate from the controller 122, or may be combined to form a combined module.

The control system 120 receives the schedules from the scheduling system 110. The controller 122 may be operatively coupled with the antenna 119 to receive the initial and/or modified schedules from the scheduling system 110. In one embodiment, the schedules are conveyed to an energy management module 124 of the control system 120. In another embodiment, the energy management module 124 may be disposed off-board the vehicle 101 for which the trip plan is formed. For example, the energy management module 124 may be disposed in a central dispatch or other office that generates the trip plans for one or more vehicles.

The energy management module 124 receives the schedule sent from the scheduling system 110 and generates a trip plan based on the schedule. As described above, the trip plan may include throttle settings, brake settings, designated speeds, or the like, of the vehicle 101 for various sections of a scheduled trip or mission of the vehicle 101 to the scheduled destination location. The trip plan may be generated to reduce the amount of fuel that is consumed by the vehicle 101 as the vehicle 101 travels to the destination location relative to travel by the vehicle 101 to the destination location when not abiding by the trip plan.

In order to generate the trip plan for the vehicle 101, the energy management module 124 can refer to a trip profile that includes information related to the vehicle 101, information related to a route over which the vehicle 101 travels to arrive at the scheduled destination, and/or other information related to travel of the vehicle 101 to the scheduled destination location at the scheduled arrival time. The information related to the vehicle 101 may include information regarding the fuel efficiency of the vehicle 101 (e.g., how much fuel is consumed by the vehicle 101 to traverse different sections of a route), the tractive power (e.g., horsepower) of the vehicle 101, the weight or mass of the vehicle 101 and/or cargo, the length and/or other size of the vehicle 101, the location of powered units in the vehicle 101, or other information. The information related to the route to be traversed by the vehicle 101 can include the shape (e.g., curvature), incline, decline, and the like, of various sections of the route, the existence and/or location of known slow orders or damaged sections of the route, and the like. Other information can include information that impacts the fuel efficiency of the vehicle 101, such as atmospheric pressure, temperature, and the like.

The trip plan is formulated by the energy management module 124 based on the trip profile. For example, if the trip profile requires the vehicle 101 to traverse a steep incline and the trip profile indicates that the vehicle 101 is carrying significantly heavy cargo, then the energy management module 124 may form a trip plan that includes or dictates increased tractive efforts to be provided by the propulsion subsystem 130 of the vehicle 101. Conversely, if the vehicle 101 is carrying a smaller cargo load and/or is to travel down a decline in the route based on the trip profile, then the energy management module 124 may form a trip plan that includes or dictates decreased tractive efforts by the propulsion subsystem 130 for that segment of the trip. In one embodiment, the energy management module 124 includes a software application or system such as the Trip Optimizer™ system provided by General Electric Company.

In the illustrated embodiment, the air brake monitoring system 140 is configured to be disposed on-board the vehicle 101. For example, the air brake monitoring system 140 may be disposed on-board a lead powered unit of a vehicle consist. In some embodiments, a plurality of air brake monitoring systems including all or a portion of the aspects of the air brake monitoring system 140 may be disposed on-board a corresponding plurality of vehicles. For example, in some embodiments having a consist including sub-consists, each lead unit of the respective sub-consists may include an air brake monitoring system 140 disposed thereon.

In the illustrated embodiment, the air brake monitoring system 140 includes a controller 142, such as a computer processor or other logic-based device that performs operations based on one or more sets of instructions (e.g., software). The instructions on which the controller 142 operates may be stored on a tangible and non-transitory (e.g., not a transient signal) computer readable storage medium, such as a memory 148. The memory 148 may include one or more computer hard drives, flash drives, RAM, ROM, EEPROM, and the like. Alternatively, one or more of the sets of instructions that direct operations of the controller 142 may be hard-wired into the logic of the controller 142, such as by being hard-wired logic formed in the hardware of the controller 142.

The air brake monitoring system 140 includes several modules, namely, the air brake control module 144 and the air brake monitoring module 146, that perform various operations described herein. The modules are shown as being included in the controller 142. As described above, the modules may include hardware and/or software systems that operate to perform one or more functions, such as the controller 142 and one or more sets of instructions. Alternatively, one or more of the modules may include a controller that is separate from the controller 142, or may be combined to form a combined module.

The air brake monitoring system also includes a display module 149. The display module 149 may include a touchscreen or other display unit configured to provide a visual display to an operator. The display module 149 may also include a modem, antenna, or the like configured to communicate information regarding the air brake system 180 to an off-board receiver, such as a scheduling system, or a system configured to determine compliance with a regulation (e.g., a requirement of a given percentage, such as about 85%, effectiveness of the air brake system 180). The display module 149 is configured to provide output regarding the performance or effectiveness of the air brake system 180. By way of example, the display module 149 may display information regarding an amount of leakage (e.g., leakage flow, or leakage volume for a given time period), the reference replenishment volume determined after the initial test, one or more replenishment volumes determined after braking activities performed during the performance of the mission or after the initiation of the mission, the distance in miles between the determination of the replenishment volume and the reference replenishment volume and/or a preceding replenishment volume, the miles traversed since the last determination of a replenishment volume, a comparison of one or more determined replenishment volumes and the reference volume, a percentage rating of brake effectiveness based upon one or more determined replenishment volumes, and the like. Further, in some embodiments, the display module 149 is configured to provide an audible or visual alarm to operator if the braking effectiveness is at or below a threshold, such as about 85%. Further still, the display module may be configured to provide an audible or visual alarm indicating that the distance since the last determination of braking effectiveness is at or approaching a threshold distance, such as 500, 750, or 1,000 miles or kilometers.

The air brake control module 144 is configured to control the application of one or more brakes of the air brake system 180. For example, the air brake control module 144 may vary an amount of pressure in the brake pipe 170 of a vehicle or consist responsive to an input or command, with the variation in pressure configured to actuate air brakes of the air brake system 180. In some embodiments, the air brake control module 144 may include a valve 145 actuated by a lever or hand wheel that may be operated by the operator. By turning the lever or wheel in a given direction or to a given position the amount of pressure in the brake pipe 170 may be varied, with the variation in pressure used to control a plurality of valves to direct air into a corresponding plurality of brake cylinders. The lever or handwheel may have a plurality of detent positions corresponding to levels of brake application (e.g., a first detent for no brake application, a second detent for a minimum service application, a third detent for a maximum service application, a fourth detent for an emergency brake application, and the like). For example, in some embodiments, air in the brake pipe 170 may be maintained at about 90 pounds per square inch (psi) (approximately 620 kPa), with the air brakes of the air brake system not actuated when the pressure in the brake pipe 170 remains at about 90 psi (620 kPa), or does not vary from about 90 psi (620 kPa) less than a threshold difference of pressure and/or does not vary by less than a threshold rate of change of pressure. A minimum service reduction may correspond to about an 8 psi (55 kPa) reduction of pressure in the brake pipe 170 (e.g., a pressure of about 82 psi or 565 kPa), and a maximum service reduction may correspond to about a 23 psi (159 kPa) reduction of pressure in the brake pipe (e.g., a pressure of about 67 psi or 462 kPa). The above examples are meant to be illustrative, and other pressure values or reductions may be employed in other embodiments.

Alternatively or additionally, the air brake control module 144 may receive an air braking activity command from the control system 120 (e.g., the control system 120 may include an air braking activity as part of a trip plan), and automatically actuate a valve to control the air pressure in the brake pipe 170 accordingly to control the air brake system 180 to perform the air braking activity called for by the control system 120. Thus, in various embodiments, the air brake control module may be configured to receive either manual or electronic inputs, and may vary the pressure manually or automatically.

In the illustrated embodiment, the air brake monitoring module 146 is configured to obtain a reference replenishment volume corresponding to a volume of air required to recharge the braking system 170 if a first amount (e.g., 100%) of brakes of the braking system 170 are operational, to obtain an actual replenishment volume corresponding to an actual volume of air used to recharge the braking system 170 after a braking activity performed by the braking system 170, and to compare the actual replenishment volume to the reference replenishment volume. The air brake monitoring module 146 may determine an effectiveness of the braking system 170 using the comparison. For example, the air brake monitoring module 146 may determine an effectiveness rating comparing a current braking capability to an original braking capability, or a percentage rating of current braking capacity compared to a reference braking capacity when all brakes are effective. In some embodiments, a comparison of features of flow curves (e.g., a rate of change of flow at one or more times during replenishment) corresponding to the reference recharging and the braking activity recharging may be used additionally or alternatively to the comparison of replenishment volumes to determine an effectiveness rating of an air brake system.

In some embodiments, the control system 120 may be configured to determine a braking effort achieved during an air braking activity. The braking effort determined by the control system 120 (or a comparison of the determined braking effort to a maximum theoretically obtainable braking effort of the air brake system) may be used to confirm or check an effectiveness rating determined by the air brake monitoring module 146.

In some embodiments, the air braking capacity or effectiveness may be compared to a threshold describing whether or not the braking capacity exceeds a required or desired minimum. The threshold may correspond to a U.S. federal regulation or other target or requirement. The air brake monitoring module 146 in some embodiments may determine whether or not the braking capability (or number of brakes effectively actuated) corresponds to a threshold, such as at least about 85% of the braking capability (or number of brakes effectively actuated), and provide an indication to an operator and/or a system disposed off-board of the consist that the threshold is satisfied (or not satisfied). The threshold may correspond to a transportation regulation of a governmental or other authority. If the threshold is not satisfied, in some embodiments, the air brake monitoring module 146 may provide an indication that the consist should be stopped and have brake repair activities performed until the threshold (e.g., 85%) is satisfied. The air brake monitoring module 146 in some embodiments may also provide an indication to the scheduling system 110 either confirming compliance with a braking effectiveness threshold or regulation and/or alerting scheduling system 110 that the vehicle 101 will be stopped for brake maintenance.

The reference replenishment volume may be obtained using replenishment information corresponding to an amount of air used to recharge the air brake system 180 after an initial test application of the braking system. For example, before beginning a mission, a test may be performed to ensure that all brakes are functional at the outset of the mission. In embodiments, with the vehicle consist stopped before embarking on a mission, a minimum service application of the air brake system 180 is performed, resulting in air being directed into brake cylinders to activate air brakes. An operator then travels the length of the vehicle consist and confirms that each air brake shoe is pressed against the corresponding wheel. The air brakes are then released, resulting in at least a portion of the air in the air brake cylinders being vented to the atmosphere. To replace air vented to the atmosphere and to return the pressure in the air pipe 170 back to the original pressure (e.g., 90 psi or 620 kPa), or recharge the air brake system 180, air must be directed from the air supply system 150 to the brake pipe 170 and the air brake system 180. (See also discussion below regarding FIG. 3 for an example of components and operation of an air brake system.) This volume may be determined by the air brake monitoring module 146 using information from the air flow detector 160, and used as a reference replenishment volume. Such a volume corresponds to the air required to recharge the air brake system 180 after deployment of all brakes in the air brake system 180 (as confirmed by visual operation by an operator).

The volume of air required to replenish the air brake system 180 corresponds to the braking capability. Each brake that deploys results in air being transferred to the corresponding brake cylinder, and thus results in a quantity of air being vented from the brake cylinders to the atmosphere when the brakes are released. To recharge the air brake system 180, that air must be replenished. As the brakes are fully released after each application, the recharge volume should be theoretically the same after each application of the air brakes for any given consist (assuming, for example, all brakes actuating, no leakage (or changes in leakage), and identical consist makeup at the time of the brake applications). The quantity or volume of air required to replenish the system is thus proportional to the number of brake cylinders that actually deployed (and/or the amount of deployment of the given brake cylinders). Disregarding potential leakage for simplicity of explanation at this point (see, for example, discussion below regarding FIG. 2 for certain leakage considerations), the volume required to replenish the system attributable to the brake cylinders of the system may be represented by the expression $V_{total} = V_1 + V_2 + V_3 + \ldots + V_n$, where $V_{total}$ is the total volume required to replenish the cylinders of the air brake system 180 (an additional volume of air may be required to replenish other aspects of the air brake system 180, such as the brake pipe 170), $V_1$ is the contribution of a first cylinder of the air brake system 180 to the total required volume, $V_2$ is the contribution of a second cylinder, and so on for the remaining cylinders up to the $n^{th}$ cylinder for a system having n total cylinders. If a particular cylinder does not actuate, that cylinder may not accept any air from the brake pipe 170 nor vent any air to the atmosphere, so that cylinder's contribution to the total volume is 0, and thus $V_{total}$ drops for non-actuating cylinders. To the extent any given cylinder actuates to some amount, but less than fully, that cylinder's contribution is also reduced and $V_{total}$ drops accordingly.

Thus, the total volume used to recharge the air brake system 180 corresponds to the number and/or effectiveness of brakes deployed. (The fewer brakes deployed, the less volume required for recharging; the lower the percentage deployment of any brakes, the less volume required for recharging.) Thus, the replenishment volumes at two different times may be compared to each other to determine the relative braking performance or capacity at those particular times. For example, a first replenishment volume determined for a recharging of an air brake system after an initial test where all brakes are confirmed to be actuated may be used as a reference value. A second replenishment volume determined for a second recharging after a service application of the air brake system may be compared to the reference value to determine the percentage effectiveness of the air brake system at the time of second replenishment. The closer the second replenishment volume is to the reference volume (which, again, corresponds to 100% of the brakes effectively actuating), the closer the brake effectiveness at the time of the second recharging is to 100%.

The replenishment volume may be determined by measuring air flow (see also, for example, discussion below regarding air flow detector 160). For example, a measured flow may be integrated with respect to time to provide a volume (as the flow may be measured, for example, in cubic feet per minute). After each application, the air brakes fully release, so the replenishment volume may be determined and compared to a reference volume corresponding to 100% air brake effectiveness to determine a current brake effectiveness (at the time of the measured recharge activity). The air brake monitoring module 146, for example, may receive a first signal from a control valve indicating release of brakes and a second signal corresponding to when pressure is within a given range of 90 psi (620 kPa) or when flow drops beyond a certain rate indicating that equilibrium is being approached, and use times corresponding to the first and second signal as boundaries for performing the integration.

Figure 2:
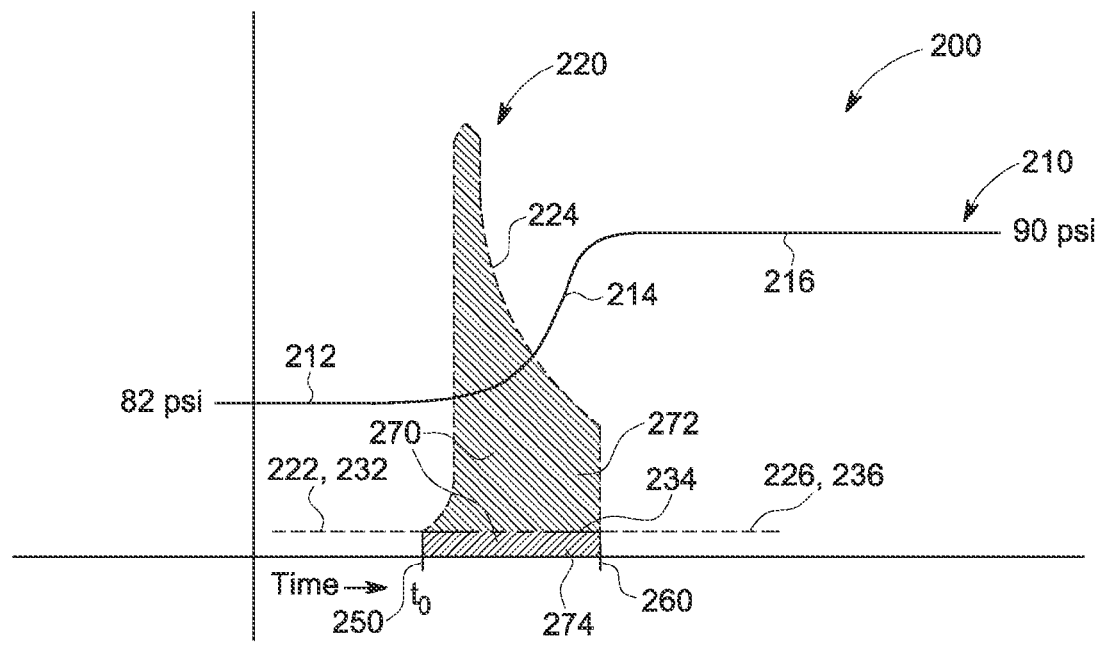
FIG. 2 is an air flow and pressure curve in accordance with one embodiment.

FIG. 2 illustrates a pressure and air flow curve 200 in accordance with an embodiment. The pressure and air flow curve 200 includes an air pressure curve 210 (depicted as a solid line) and an air flow curve 220 (depicted as a dashed line). FIG. 2 depicts the air pressure in a brake pipe (such as the brake pipe 170) both before and after a release of air brakes at a time of $t_o$ indicated at 250. The portion of the air pressure curve 210 and the air flow curve 220 before $t_o$ corresponds to a minimum service application of the air brakes of a consist, the portions of the air pressure curve 210 and the air flow curve 220 between 250 ($t_o$) and 260 correspond to the release and recharging of the air brake system, and the portions of the air pressure curve 210 and the air flow curve 220 after 260 correspond to equilibrium having been reached in the system as recharging is complete. By measuring the air flow during the recharging, (e.g., from 250 to 260) and integrating the measured air flow, a replenishment volume for that particular recharging may be determined.

The air pressure curve 210 includes a first portion 212 corresponding to a service application, a second portion 214 corresponding to a recharging, and a third portion 216 corresponding to equilibrium having been reached after a release and recharging of the air brake system. In the depicted embodiment, the first portion 212 may correspond to a minimum service application wherein pressure in the brake pipe (e.g., brake pipe 170) is about 82 psi (565 kPa), and the third portion 214 may correspond to a reference equilibrium value of about 90 psi (620 kPa), where the brakes are not applied during the corresponding portion of the mission.

The air flow curve 220 includes a first portion 222 corresponding to a service application, a second portion 224 corresponding to a recharging, and a third portion 226 corresponding to equilibrium having been reached after a release and recharging of the air brake system. The particular shape of the air flow curve 220 is intended for illustrative purposes and may vary in practice in different embodiments. The first portion 222 corresponds to a service application, and thus does not represent flow associated with the recharging of the air brake system. Instead, the first portion 222 depicts leakage in the system. The second portion 224, which begins at the release 250 of the air brakes, corresponds to flow during the recharging of the air brake system. At the beginning of the recharge operation, the air flow is relatively high but decreases as the individual brake reservoirs fill and equilibrium is approached. Once equilibrium is reached at 260, the air flow drops rapidly until the air flow again depicts leakage for the third portion 226.

In FIG. 2, the leakage 230 includes a first portion 232 corresponding to a service application (which also corresponds to the first portion 222 of the air flow curve 220), a second portion 234 (depicted in phantom line) corresponding to a recharging, and a third portion 236 corresponding to equilibrium having been reached after a release and recharging of the air brake system (which also corresponds to the third portion 236 of the air flow curve 220). In the depicted embodiment, the leakage is shown as generally constant throughout. However, in practice, the leakage may vary. For example, if the leakage differs substantially at the time of a first determined replenishment volume to a second determined replenishment volume, then leakage may be accounted for to provide an improved comparison of the two replenishment volumes.

The volume of air flow during the recharging, or replenishment (corresponding to the second portion 224 of the flow curve 220 (from 250 to 260) may be described by the relationship $V_{Recharge}=V_{Measured}-V_{Leakage}$, where $V_{Recharge}$ is the volume used to recharge the air brake system, $V_{Measured}$ is the volume based on the measured air flow, and $V_{Leakage}$ is the volume attributable to leakage. Thus, if leakage is different for 2 different times (e.g., at or around a first time of an initial test, and at or around a time of a service application of an air brake system during a mission), the difference in leakage may be accounted for.

In the embodiment depicted in FIG. 2, because an integral may be understood as the area under a curve, $V_{Recharge}$ may be determined by measuring areas under the second portion 224 of the air flow curve 220 (e.g., during the recharging between 250 and 260). $V_{Measured}$ may be understood as the total area 270 under the second portion 224. $V_{Leakage}$ may be understood as the area 274 under the second portion 234 of the leakage 230. Thus, $V_{Recharge}$ may be understood as the area 272 beneath the second portion 224 of the air flow curve 220 but above the second portion 234 of the leakage 230, or the result of subtracting $V_{Leakage}$ (e.g., area 274) from $V_{Measured}$ (e.g., area 270). In other embodiments, other features of the flow curve 220, such as a slope of the second portion 224 of the flow curve 220, may be used to define a shape of the recharging air flow that may be compared to a corresponding shape of an air flow curve corresponding to a recharging after an initial test.

In some embodiments, $V_{Leakage}$ may be estimated using information obtained at a time other than during the recharge. For example, the leakage flow and/or volume may be estimated using the first portion 232 of the leakage curve 230, the third portion 236 of the leakage curve 230, or a combination (such as an average) of the first portion 232 and the third portion 236 of the leakage curve. In some embodiments, the leakage may be monitored substantially continuously. "Substantially continuously" may be understood to include monitoring performed at generally short time intervals relative to the performance of a mission. In some embodiments, the leakage may be monitored substantially continuously at time intervals of about one second, about five seconds, about ten seconds, or about twenty seconds. In various embodiments, a running average may be computed using information from the air flow detector 160. One or more leakage values obtained at a time at or near the time of a given recharging used to determine $V_{Recharge}$ for that given recharging.

The timing of the determination of the replenishment volume may be selected to comply or correspond to a regulation. For example, current U.S. regulations require brake inspection within 1,000 miles of a previous inspection. Thus, the replenishment volume for a braking activity may be determined at an interval of 1,000 miles (or other designated distance) or less from a previous determination. In some embodiments, the control system 120 may be configured to provide an air braking activity at intervals of 1,000 miles or less during performance of a mission.

For example, the control system 120 may identify air brake activities called for by a pre-determined trip plan (for example, one or more service applications of the air brake system planned to supplement a dynamic braking activity, such as when a consist brakes down a steep grade). To the extent any air braking activities are part of an existing trip plan, such air braking activities may be used to determine replenishment volumes and corresponding air brake effectiveness. If such activities as part of the pre-determined trip plan do not occur at intervals of less than 1,000 miles (or other designated distance), the control system 120 may add an air braking activity to the trip plan. For example, one or more braking activities originally planned as a dynamic braking activity may be converted to, or supplemented by, an air braking activity to ensure that an air braking activity (and corresponding re-charging that may be measured to determine replenishment volume) occurs within a desired threshold, such as 500, 750, or 1,000 miles or kilometers. Thus, a dynamic braking activity originally scheduled as part of a trip plan may be supplemented by or changed to an air braking activity to facilitate an effectiveness rating of an air brake system (e.g., by measuring an air flow and/or volume after the braking activity and comparing the measured air flow and/or volume to a reference flow and/or volume). Additionally or alternatively, the control system 120 may include a minimum service application of the air brakes at one or more points during the mission where no braking activity was scheduled, and/or may include a minimum service air brake application at one or more stops along the mission to provide for a determination of a corresponding replenishment volume. Further additionally or alternatively, the control system 120 may be configured to control the vehicle 101 based on a determined air brake effectiveness rating. For example, the control system 120 may adjust (e.g., increase) a previously determined amount or effort of a planned air braking activity to account for a reduction in air brake effectiveness.

In some embodiments, the determination of volume may be done by a single processing unit or analysis module disposed on a unit such as a lead powered unit of the consist. In some embodiments, where air is supplied to a consist from a plurality of units (e.g., the lead powered units of each sub-consist of the consist), an analysis module may be disposed on-board each lead powered unit. The lead powered unit of each sub-consist may determine the replenishment volume for that particular sub-consist, with each lead powered then reporting the sub-consist replenishment volumes to a predetermined analysis module (e.g., an analysis module disposed on-board the lead powered unit of the lead consist) that combines the sub-consist replenishment volumes to determine a total replenishment volume. In other embodiments, an analysis module disposed elsewhere than on the lead consist may determine the total replenishment volume, such as an analysis module disposed on a remote consist or off-board of the consist.

Such a measurement and comparison of replenishment volumes after braking activities (e.g., after an initial test where the brakes are confirmed at 100% effectiveness, and after a subsequent braking activity) provide improved accuracy in determining actual effectiveness of an air brake system. For example, conventional systems using electronic reporting or polling protocols may only measure the percentage of units that are reporting, which may differ from the units that are actually effective (e.g., a unit with a stuck brake cylinder may still be in communication with a central processor, and thus be reporting but not effective).

Returning to FIG. 1, the air supply module 150 is configured to provide air to the brake pipe 170 to supply the actuation reservoirs and/or cylinders associated with braking units on individual units of the consist, and to maintain the brake pipe 170 at or near a desired pressure (e.g., to counteract leakage in the system). In some embodiments, only one air supply module 150 may be disposed on a single unit of a consist (e.g., a lead powered unit of the consist), while in other embodiments, a plurality of air supply modules 150 may be disposed on a corresponding plurality of units of a consist (e.g., the lead powered units of each sub-consist of a consist). In the illustrated embodiment, the air supply module is depicted as including a compressor 152 and a system reservoir 154 each disposed on-board the vehicle 101. In other embodiments, the system reservoir 154 may be in fluid communication with and supplied with air by additional compressors and/or reservoirs disposed on other units of a consist. For example, a system reservoir 154 disposed on-board a lead powered unit of a consist may receive air from compressors and/or reservoirs of one or more of the remote powered units of the consist.

The air flow detector 160 is disposed proximate to the connection between the air supply module 150 and the brake pipe 170, and is configured to measure air flow from the air supply module 150 to the brake pipe 170. In some embodiments, where more than one air supply module 150 and/or more than one connection points between the brake pipe 170 and air supply module(s) 150 are present, a plurality of air flow detectors 160 may be employed, with each air flow detector 160 disposed proximate to a connection between a supply source (e.g., air supply module 150) and the brake pipe 170. In some embodiments, the air flow is measured as a volumetric flow. In some embodiments, the air flow is measured as a mass flow. (Further, if pressure and temperature are known, for example, the mass flow may be converted to a volumetric flow using the ideal gas law.) The greater the resolution of the sensor used, the better will be the ability to detect the effect of a single ineffective brake, particularly for consists or sub-consists having a relatively small number of brake reservoirs and cylinders. Thus, in some embodiments, a high precision flow meter such as a high precision mass flow sensor is employed, instead of conventional low precision flow meters used in certain known vehicle systems for purposes other than monitoring air brakes as described herein.

For example, for the high precision mass flow sensor, a mass flow sensor such as the industrial thermal mass flow meters from Sierra® Instruments may be used in some embodiments. Such mass flow sensors may provide the required resolution at the flow rates encountered in the brake pipe of a consist, while being able to satisfactorily withstand the demanding environment of a consist performing a mission. For example, an immersible thermal mass flow meter may be used as an air flow detector 160 in some embodiments.

Immersible mass flow sensors typically include a heated element (or velocity sensor) and a passive element (or temperature sensor). Each sensor may be a platinum resistance temperature detector, for which resistance changes substantially linearly with temperature, allowing temperature to be determined by analyzing the resistance of the detector. The sensors may be arranged generally parallel to each other and disposed within a conduit (such as a brake pipe) through which air flows. The heated element (velocity sensor) is heated to a temperature $T_{velocity}$. As the air flow increases, convection removes heat from the heated element causing the heated element to cool. The temperature of the air ($T_{air}$) is measured by the passive element (temperature sensor). Electronics or a processor associated with the passive and heated elements compares $T_{velocity}$ with $T_{air}$, and maintains the velocity sensor at a constant temperature differential above the temperature sensor, so that $T_{velocity} - T_{air}$ is maintained at a constant value. The power required to heat the velocity sensor to maintain the desired differential is proportional to the heat removed by the air flow, which is directly proportional to the mass velocity, allowing the mass velocity, or mass flow, to be determined.

The brake pipe 170 is connected to and receives air from the air supply system 150. The brake pipe 170 is connected to and provides air to the air brake system 180. In the illustrated embodiment, the brake pipe 170 is shown as connected to a single air supply system 150 and a single air brake system 180; however, in some embodiments the brake pipe 170 may be connected to a plurality of air brake systems 180 and/or a plurality of air supply systems 150. Further, the brake pipe 170 may be connected to a given air supply system 150 at more than one point. The brake pipe 170 in some embodiments is about 1¼ inch (3.175 cm) in diameter. The brake pipe 170 is also operably connected to the air brake control module 142, which may control the pressure in the brake pipe 170 to control air braking activities. The pressure in the brake pipe 170 may be controlled as discussed above to initiate an actuation of air brakes (e.g., when a sufficient reduction in the pressure in the brake pipe occurs) or to initiate a release and recharging of air brakes (e.g., when the pressure in the brake pipe 170 is increased after a service reduction).

The air brake system 180 is in fluid communication with the brake pipe 170, so that air may be supplied to the air brake system 180 from the brake pipe 170. Air pressure in the brake pipe 170 may also be employed as a control signal for a valve (see discussion below in connection with FIG. 3) associated with the air brake system 180 (e.g., a reduction in pressure in the brake pipe 170 may result in the valve acting to actuate a brake cylinder). Further, air from the air brake system 180 may be vented to the brake pipe 170 and/or to the atmosphere. The air brake system 180 is configured to actuate an air-operated brake to help slow or stop the vehicle 101. In the illustrated embodiment, only one air brake system 180 is shown; however, a plurality of air brake systems 180 may be connected to the brake pipe 170 and form a composite or combined air brake system. For example, one air brake system 180 may be associated with each unit of a consist (e.g., one air brake system 180 for each powered unit, such as a locomotive, and for each non-powered unit, such as a freight-carrying unit). In other embodiments, more than one air brake system 180 per unit may be disposed on the powered and non-powered units of a consist. Examples of various aspects and components of an air brake system, such as air brake system 180, may be better understood with reference to FIG. 3.

Figure 3:
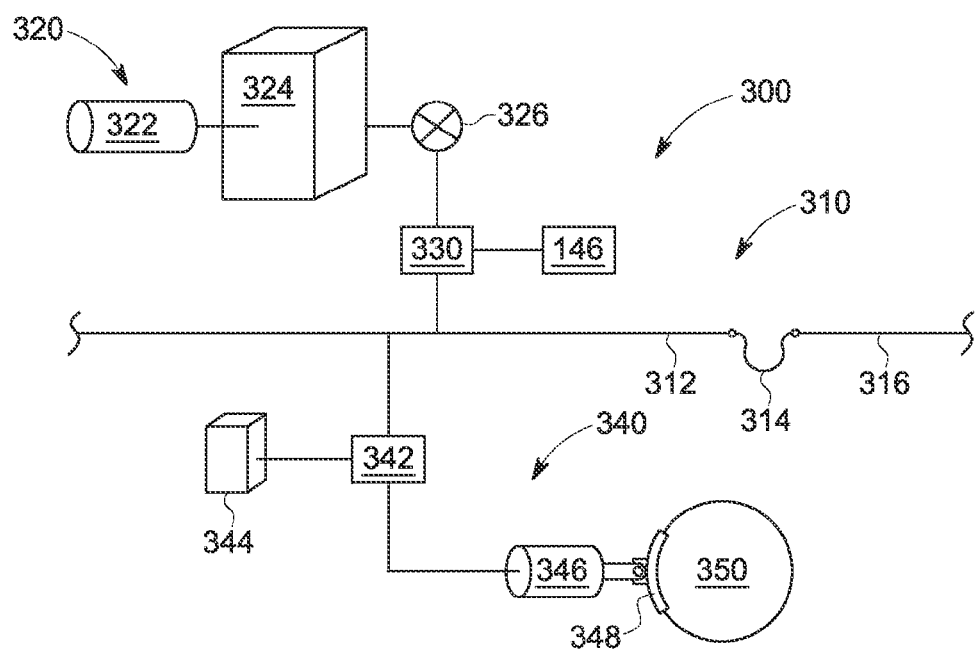
FIG. 3 is a schematic diagram of an air brake system in accordance with one embodiment.

FIG. 3 is a schematic view of an air brake system 300. The air brake system includes a delivery system 310, a supply system 320, a measuring system 330, an actuation system 340, and a wheel 350. The depiction of FIG. 3 is intended as schematic in nature, and a particular system or aspect may represent, for example, a plurality of similar systems or aspects. For example, the actuation system 340 may be provided with a linkage configured to allow the actuation system 340 to apply brakes to a plurality of wheels 350. For example, a single actuation system 340 may be used to apply brakes to all wheels 350 of a given unit of a consist. Further, a plurality of supply systems 320, measuring systems 330, and actuation systems 340 may be provided in some embodiments. For example, in some embodiments having a lead consist and remote consists, there may be one actuation system 340 per unit (e.g., powered or non-powered) of the consist, as well as a supply system 320 and measuring system 330 associated with each lead unit of each sub-consist.

The delivery system 310 includes a plurality of brake pipe portions joined by coupled hoses. In the illustrated embodiment, a first brake pipe portion 312 associated with a first unit of a consist or sub-consist (e.g., a lead powered unit) is joined by a coupled air hose 314 to a second brake pipe portion 316 associated with a second unit of the consist or sub-consist. The coupled air hose 314 is configured to allow articulation between the first brake pipe portion 312 and the second brake pipe portion 316 as a consist including the first and second units traverses a route (for example allowing the first and second units to be angled with respect to each other as the consist traverses a curve). The delivery system 310 is configured to receive air from the supply system 320 and to deliver air to the actuation system 340.

The supply system 320 includes a supply reservoir 324 and a compressor 322. In some embodiments, the supply system 320 is disposed on the lead powered unit of a consist or sub-consist. The compressor 322 is configured to provide air to the supply reservoir 324, from where air may be supplied to the delivery system 310 via a control valve 326. The control valve 326 may be controlled by an operator, and have a plurality of predetermined settings corresponding to a pressure to be maintained in the delivery system 310. For example, the control valve 326 may have a first setting corresponding to a reference pressure (e.g., about 90 psi or 620 kPa) at which pressure the air brakes are not actuated, a second setting (e.g., about 82 psi or 565 kPa) at which the air brakes are applied at a minimum service level, a third setting at which the air brakes are applied at a maximum service level, and a fourth setting at which the air brakes are applied at an emergency (e.g., strongest possible application) level. Other settings may be used in other embodiments, and in some embodiments intermediate positions (e.g., between the minimum and maximum service settings) may be selectable. Further, the supply reservoir 324 may be supplied from one or more reservoirs and/or compressors disposed on different units of the consist than the unit the supply reservoir 324 is disposed on. For example, the supply reservoir 324 may be disposed on a lead powered unit of a consist, and may be supplied by corresponding supplied reservoirs disposed on remote powered units of the consist.

The measuring system 330 is configured to measure the flow of air from the supply system 320 to the delivery system 310 (and one or more corresponding actuation systems 340). The measuring system 330 may include, for example, a high precision mass flow meter as discussed above. A plurality of measuring systems 330 may be employed. For example, a measuring system 330 may be disposed proximate to each connection between an air supply source and the delivery system 310, with each measuring system 330 measuring air flow from the corresponding connection point to the delivery system 310. For example, the measuring system 330 may measure flow required to replace air lost during leakage during periods of time when the air brakes of the system 300 are not employed (e.g., monitoring for monitoring leakage or parasitic losses), and to measure air flow required to replenish the delivery system 310 and corresponding actuation systems 340 after a release of the brakes. The measuring system 330 may be operably connected with an analysis module or processing unit such as the air monitoring analysis module 146 discussed above, and provide the air monitoring analysis module with information regarding the flow measured by the measuring system 330.

The actuation system 340 is configured to actuate a brake against a wheel 350 to slow or stop a vehicle, such as a consist. The depicted actuation system 340 is meant by way of example, as other arrangements may be employed in various embodiments. The depicted actuation system 340 includes a triple valve 342, and actuation reservoir 344, a brake cylinder 346, and a brake shoe 348. In the illustrated embodiment, a single shoe 348 and wheel 350 are depicted; however, in some embodiments, the brake cylinder 346 may have a linkage associated therewith configured to allow the brake cylinder to actuate a plurality of shoes 348 against corresponding wheels 350. For example, a given unit of a consist may have a single actuation system 340 disposed thereon, with the brake cylinder 346 operably connected to each shoe 348/wheel 350 combination of the unit. In other embodiments, more than one actuation system 350 per unit of a consist may be provided.

Generally, speaking, the triple valve 342 is configured to direct air between three locations: the delivery system 310, the actuation reservoir 344, and the brake cylinder 346. When air is directed from the delivery system 310 to the actuation reservoir 344, the actuation system is re-charged. When air from the actuation reservoir 344 is directed to the brake cylinder 346, the brake cylinder 346 is urged to an extended position, pressing and/or maintaining the brake shoe 348 against the wheel 350 to apply a braking activity. When air from the brake cylinder is returned to the actuation reservoir 344 and/or vented to the atmosphere, the brakes are released. In some embodiments, the actuation reservoir 344 may include two portions (a service portion and an emergency portion), with the emergency portion containing air that is only released to the brake cylinder 346 during an emergency application. Thus, additional reservoir volume(s) may need to be replenished after an emergency application when compared to a service application. Further, after an emergency application of the air brakes, the brake pipe may be empty or near empty, whereas the brake pipe may be only slightly depleted during a service application. Thus, an emergency application may provide more braking capability due to the increased volume of air available, and a recharging after an emergency application may require a correspondingly larger volume of air to replenish not only the service portion but also the emergency portion of the actuation reservoir and/or additional volume for the brake pipe. Thus, in some embodiments, an emergency replenishment volume may be compared to a service replenishment volume if the effect on volume of the additional emergency portions of the actuation reservoirs and/or the brake pipe of a system are appropriately accounted for.

The triple valve 342 is configured to control the flow of air responsive to changes in the pressure of air in the brake pipe 312 associated with the unit on which the triple valve 342 is disposed. For example, during routine operation of a consist during which air brakes are not to be applied, air in the brake pipe 312 is maintained at or near a reference pressure, for example about 90 psi (620 kPa). At this reference pressure, the brake system 300 is at an equilibrium, with pressure in the actuation reservoir 344 about equal to pressure in the brake pipe 312. At a service application of the brakes, the pressure in the brake pipe 312 is reduced a pre-determined amount (for example to 82 psi or 565 kPa), resulting in the pressure in the actuation reservoir 344 exceeding the pressure in the brake pipe 312. At this point, an exhaust port of the brake cylinder 346 is closed and the triple valve 342 directs air from the actuation reservoir 344 to the brake cylinder 346 to apply the air brake, urging the brake shoe 348 against the wheel 350. Air is delivered from the actuation reservoir 344 to the brake cylinder 346 until the pressure in the actuation reservoir 344 is about equal to the pressure in the brake pipe 312, and the brake cylinder 346 is maintained at a constant pressure. When the service application is complete, the control valve 326 of the supply system 320 is used to raise the pressure in the brake pipe 312 (by supplying air from the main reservoir 324 to the brake pipe 312) back to the reference level (e.g., about 90 psi or 620 kPa). With the pressure in the brake pipe then exceeding the pressure in the actuation reservoir 344, the triple valve 342 acts to direct air from the brake pipe 312 into the actuation reservoir 344, and air from the brake cylinder 346 is exhausted to the atmosphere (a portion of the air from the brake cylinder 346 may be directed into the actuation reservoir 344 as well). Once the pressure in the actuation reservoir 344 is brought about equal with the pressure in the brake pipe 312, recharging is complete, and the triple valve 342 closes, maintaining the pressure in the actuation reservoir 344 and the brake cylinder 346 at the reference level.

Because the volume of air to replenish the air brakes of a given vehicle system should generally remain constant (with leakage accounted for), changes in the capacity of the air brakes of the vehicle system may be monitored by monitoring reductions in the volume of air required to replenish or recharge the air brakes. The fewer brakes that remain functional or fully functional, the lower the replenishment volume will become, as fewer cylinders will actuate thus lowering the amount of air that is vented to the atmosphere and thus is replaced during re-charging.

Figure 4:
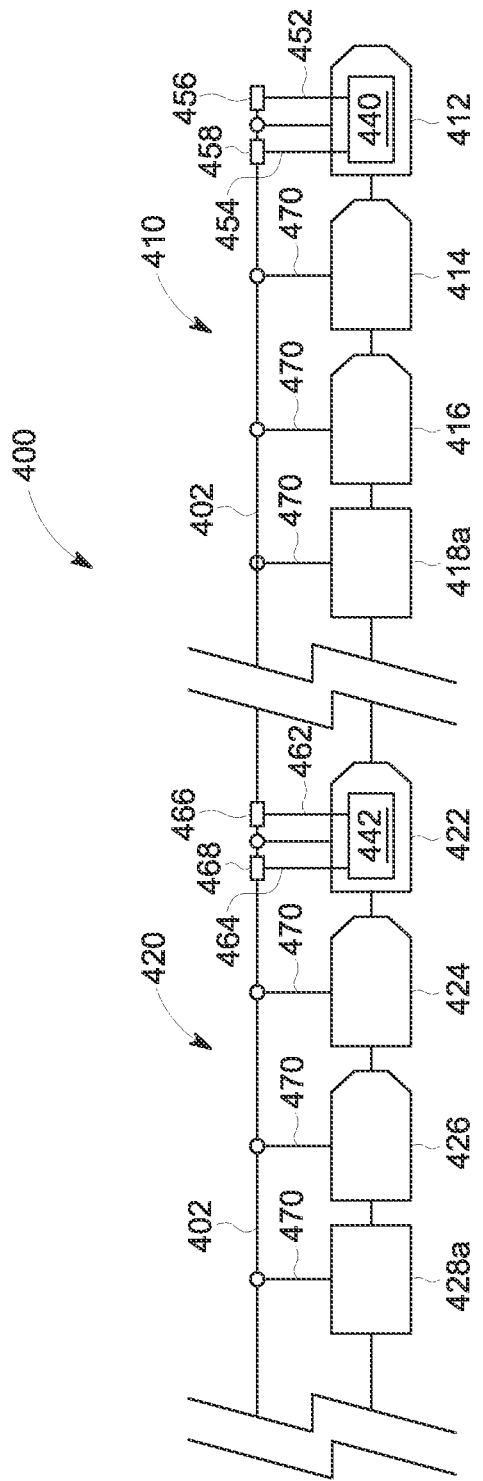
FIG. 4 is a schematic diagram of a vehicle system in accordance with one embodiment.

FIG. 4 provides a schematic view of a vehicle system 400. The vehicle system 400 includes a brake pipe 402, a lead consist 410 and a remote consist 420. The vehicle system 400 is configured as a distributed power train with powered units disposed at different positions along the length of the vehicle system 400. The lead consist 410 is depicted toward the front of the vehicle system 400 (in the direction of travel) but could be located elsewhere in other embodiments. The brake pipe 402 is operably connected to each unit in the vehicle system 400, and is configured both to supply the air brakes of the individual units as well as to provide a control signal that indicates whether the air brakes should, for example, be applied, or, as another example, be released. The brake pipe 402 is depicted for simplicity as being a generally continuous pipe between units of a consist, however in practice couplings would be provided between each unit allowing the brake pipe 402 to articulate as the vehicle system traveled, for example, around a curve. The lead powered units of the respective consists may be configured to provide control signals indicating tractive and or braking activities to be performed by the various other units of the particular consist.

The lead consist 410 includes a lead powered unit 412, a second powered unit 414, a third powered unit 416, and non-powered units 418a-418n. (In the illustrated embodiment, only the non-powered unit 418a is depicted). In the illustrated embodiment, the powered units are shown consecutively arranged, however other arrangement may be used in other embodiments. For example, non-powered units may be interposed between the various powered units. Generally speaking, the powered units 412, 414, 416 are configured for self-propulsion, whereas the non-powered units 418a-n are not.

In the illustrated embodiment, the lead powered unit 412 includes a reservoir 440 disposed on-board. The reservoir 440 may receive air from a compressor (not shown) disposed onboard the lead powered unit 412, and/or from compressors and/or reservoirs disposed onboard other powered units 414, 416 of the lead consist 410. The reservoir 440 is configured to provide air to the brake pipe 402 from the reservoir 440 via a first connection 452 disposed proximate a first end of the lead powered unit 412 and a second connection 454 disposed proximate a second end of the lead powered unit 412. A first flow meter 456 is associated with the first connection 452, and a second flow meter 458 is associated with the second connection 454. Information from the flow meters 456, 458 is provided to an air brake analysis module (see discussion above) disposed onboard the lead powered unit 412. As discussed above, the air brake analysis module uses information from the flow meters 456, 458 to monitor leakage and determine a replenishment volume for a recharging operation of the air brakes of the vehicle system 400. Each powered unit and each non-powered unit of the lead consist 410 receives air from the brake pipe 402 via a supply line 470. One supply line 470 is depicted per unit, however, in some embodiments more supply lines may be present.

After an application and release of the air brakes, air flow may be measured at the air flow meters 456, 458 to determine a lead consist replenishment volume. In the illustrated embodiment, the air flow meter 456 is positioned at an end of the vehicle system 400 through which air does not pass (as no units are disposed outward of the air flow meter 456), and thus flow measured by the air flow meter 458 may be used to determine the replenishment volume of the lead consist 410. Additionally, the air brake monitoring module of the lead powered unit 412 of the lead consist 410 may also receive replenishment volume information from remote consists (e.g., from lead powered unit 422 of the remote consist 410), and add the replenishment volumes for all of the consists or sub-consists of the vehicle system 400 to determine a total replenishment volume.

The remote consist 420 includes a lead powered unit 422, a second powered unit 424, a third powered unit 426, and non-powered units 428a-428n. (In the illustrated embodiment, only the non-powered unit 428a is depicted). In the illustrated embodiment, the powered units are shown consecutively arranged, however other arrangement may be used in other embodiments. For example, non-powered units may be interposed between the various powered units. Generally speaking, the powered units 422, 424, 426 are configured for self-propulsion, whereas the non-powered units 428a-n are not.

In the illustrated embodiment, the lead powered unit 422 of the remote consist includes a reservoir 442 disposed onboard. The reservoir 442 may receive air from a compressor (not shown) disposed onboard the lead powered unit 422, and/or from compressors and/or reservoirs disposed onboard other powered units 424, 426 of the remote consist 420. The reservoir 440 is configured to provide air to the brake pipe 402 from the reservoir 442 via a first connection 462 disposed proximate a first end of the lead powered unit 422 and a second connection 464 disposed proximate a second end of the lead powered unit 422. A first flow meter 466 is associated with the first connection 462, and a second flow meter 468 is associated with the second connection 464. Information from the flow meters 466, 468 is provided to an air brake analysis module (see discussion above) disposed onboard the lead powered unit 422. As discussed above, the air brake analysis module uses information from the flow meters 466, 468 to monitor leakage and determine a replenishment volume for a recharging operation of the air brakes of the vehicle system 400. Each powered unit and each non-powered unit of the remote consist 420 receives air from the brake pipe 402 via a supply line 470. One supply line 470 is depicted per unit, however, in some embodiments more supply lines may be present.

After an application and release of the air brakes, air flow may be measured at the air flow meters 466, 468 to determine a remote consist replenishment volume. Once a remote consist replenishment volume has been determined onboard the lead powered unit 422, the lead powered unit 422 may provide the remote consist replenishment volume to the lead powered unit 412 of the lead consist 410, where a total replenishment volume may be determined. The consist replenishment volume may be communicated, for example, via a wireless connection, or, as another example, via a hard-wired connection. In some embodiments, the remote consist replenishment volume may be determined at the lead powered unit 412 of the lead consist 410 using information provided by the air flow meters 466, 468.

In the vehicle system 400, the lead powered units of the respective consists are used to supply air for the air brake system, measure air flow, and determine replenishment volumes. However, in alternate embodiments, additional or alternative powered units may be designated for air supply, measurement, or replenishment volume determination. In the depicted embodiment, the lead powered unit of the lead consist includes a processing unit or analysis module for determining the total replenishment volume of the consist. Alternatively or additionally, in some embodiments, the determination of the total replenishment volume may be made by a processing unit or analysis module disposed onboard a lead powered unit of a remote consist, a processing unit or analysis module disposed onboard a different unit of the consist, and/or a processing unit or analysis module disposed off-board of the consist.

Figure 5:
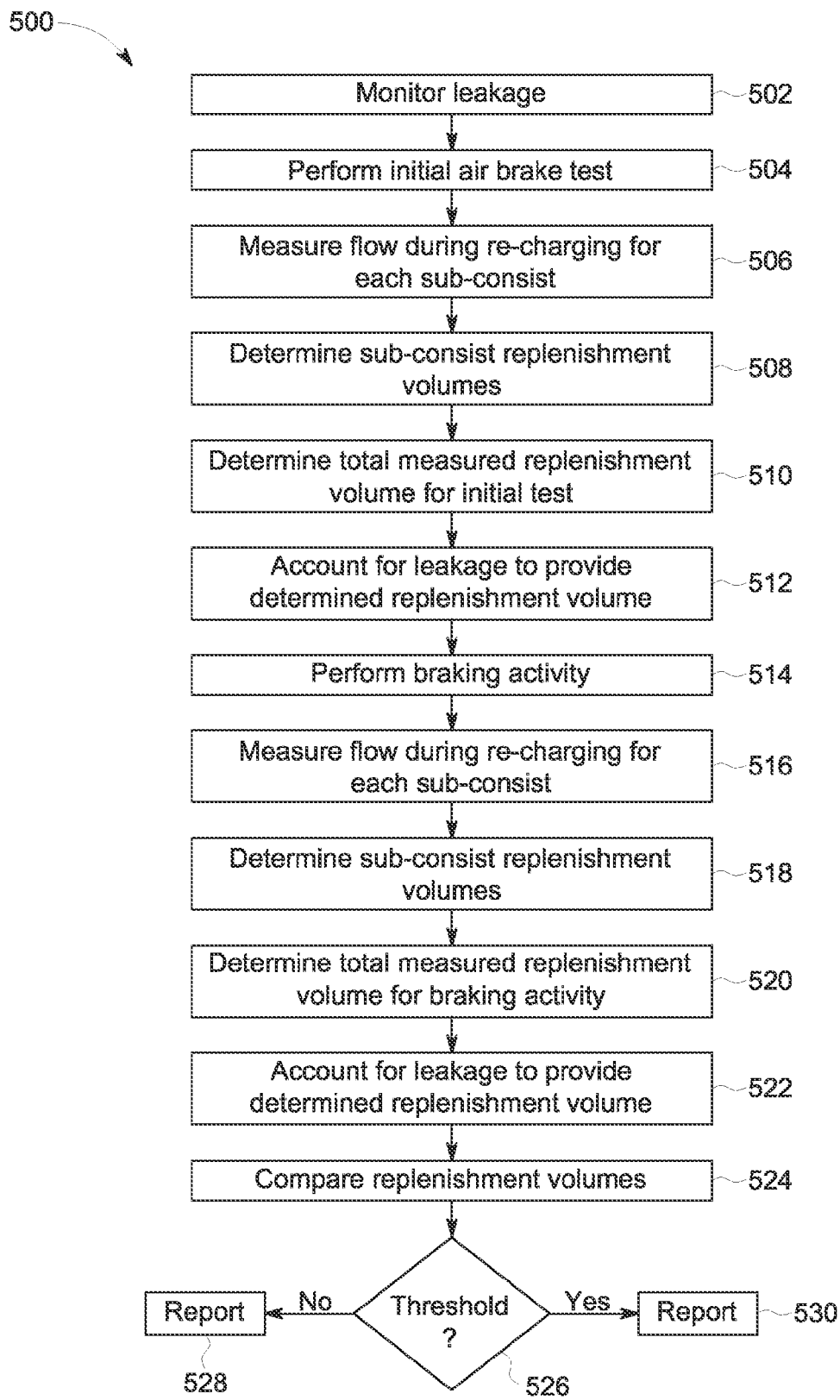
FIG. 5 is a flowchart of one embodiment of a method for monitoring air brakes in accordance with one embodiment.

FIG. 5 is a flowchart of one embodiment of a method 500 for monitoring an air brake system of a consist. The method 500 may be performed, for example, using certain components, equipment, structures, or other aspects of embodiments discussed above. In certain embodiments, certain steps may be added or omitted, certain steps may be performed simultaneously or concurrently with other steps, certain steps may be performed in different order, and certain steps may be performed more than once, for example, in an iterative fashion.

At 502, with the brake pipe of an air brake system pressurized and the air brake system at an equilibrium position, leakage is monitored. One or more air flow detectors may be positioned to measure air flow into the brake pipe from a supply source, such as a supply reservoir disposed onboard a lead powered unit of a consist. As the system is being maintained at a constant reference pressure (e.g., 90 psi or 620 kPa), the air flow into the brake pipe from the supply reservoir(s) is about equal to the air flow lost due to leakage. By integrating the air flow over a desired time frame, the volume of leakage lost for the desired time frame may be determined. In some embodiments, the air flow due to leakage may be monitored substantially continuously, and a running average of leakage air flow and/or leakage volume may be determined and monitored.

At 504, an initial air brake test is performed. The initial air brake test may be performed with the consist at a stop before undertaking a mission. With all of the units of the consist coupled, and the air brake system charged and equalized at a reference pressure (e.g., about 90 psi or 620 kPa), a minimum service application of the air brakes may be applied. For example, an operator may actuate a control valve to a predetermined position that reduces pressure in the brake pipe a specified amount corresponding to a minimum service application of the air brakes. In some embodiments, the reduction may be about 8 psi (55 kPa) to about 82 psi (565 kPa). With the minimum service application maintained, one or more operators may then walk the length of the train and visually confirm that the brakes of each unit of the consist are functional (e.g., each brake shoe actuated against a corresponding portion of a wheel). Appropriate repair or maintenance activities may be performed for any brakes that are not functioning. Thus, in some embodiments, it is known that all air brakes are functioning properly at the time of the initial test.

At 506, the air flow during recharging of the air brake system after the initial test is measured for each sub-consist of the consist. After it is confirmed that each brake was functional during the initial test, an operator may return the control valve from the position corresponding to the minimum service application to the original reference position. The pressure in the brake pipe may then increase, resulting in the release of the brakes and the recharging of the system. Air flow detectors positioned at each supply point of the brake pipe may be used to measure the flow of air from supply reservoirs into the brake pipe. In some embodiments, the consist includes a plurality of sub-consists, with each sub-consist including a lead powered vehicle. The brake pipe is supplied at two points from each lead powered vehicle, and air flow into the brake pipe at the corresponding two points of each lead powered vehicle is measured. The flow may be measured from the release of the brakes to the equalization of the system at the reference pressure (e.g., 90 psi or 620 kPa). In some embodiments, a measured mass flow may be converted to a volumetric flow.

At 508, the flow for each sub-consist is used to provide (e.g., by integration) a sub-consist measured replenishment volume for each of the sub-consists. In some embodiments, each lead powered unit of the sub-consists includes a processing unit or analysis module configured to receive air flow information from the air flow detectors of the particular sub-consist and determine the sub-consist measured replenishment volume using the air flow information from the air flow detectors associated with the particular sub-consist. For example, the analysis module may integrate the measured air flow over the time from release to equilibrium at the reference pressure (e.g., 90 psi or 620 kPa).

At 510, the plurality of sub-consist measured replenishment values are added together to provide a total measured replenishment volume. In some embodiments, each lead powered unit of the remote sub-consists of the consist provides the measured replenishment volume for that particular sub-consist to the lead powered unit of the lead consist. An analysis module disposed on-board the lead powered unit of the lead consist then adds the measured replenishment volumes for each remote sub-consist to the measured replenishment volume for the lead consist to provide a total replenishment volume for the consist.

At 512, the total measured replenishment volume for the recharging corresponding to the initial test of the air brake system is adjusted to account for leakage. For example, an estimated leakage volume may be subtracted from the total measured replenishment volume to provide a determined replenishment volume corresponding to the initial test. The estimated leakage volume may be estimated from leakage monitored before the initial test, after the initial test, or a combination (such as an average) of leakage monitored before and after the initial test. The determined replenishment volume for the initial test may be used a reference volume (corresponding to 100% effectiveness of the air brakes of the air brake system) to which subsequently determined replenishment volumes are compared.

At 514, a braking activity is performed. The braking activity may be a service application of the brakes, for example a minimum service application. The braking activity at 514 is performed at a time after the initial test and after the consist has traversed a portion of the mission of the consist. In some embodiments, the braking activity is performed before the consist has traversed a predetermined distance (e.g., 1,000 miles or km) since a previous determination of the effectiveness of the air brakes, such as an initial test, or as another example, since a recharging activity subsequent to the initial test for which a replenishment volume has been obtained. In some embodiments, the braking activity is performed with the consist stopped, for example, at a siding. In some embodiments, the braking activity is performed pursuant to a trip plan that includes the braking activity as one of the braking efforts to be performed as part of the mission of the consist. For example, the trip plan may substitute an air braking activity for a braking event that would otherwise be addressed by a dynamic braking activity, so that there is at least one air braking activity performed every 1,000 miles or less that the consist traverses as part of the mission. The braking activity may be performed automatically by a control system of the consist, or may be initiated by an operator, for example pursuant to an indicator or prompt directing the operator to perform the braking activity before a certain time or distance traveled by the consist.

At 516, the flow for each sub-consist is used to provide (e.g., by integration) a sub-consist measured replenishment volume for each of the sub-consists. At the completion of the braking activity, an operator may return the control valve from the position corresponding to the braking activity to the original reference position. (Generally speaking, the brakes fully release after each application, so the recharging volume from any service application may be compared to the initial test performed at a minimum service application. Emergency applications of the air brakes generally involve an additional volume of air from the system, and thus an adjustment may be required to compensate for the additional volume of air corresponding to an emergency application before a comparison to a service application replenishment.) The pressure in the brake pipe may then increase, resulting in the release of the brakes and the recharging of the system. Air flow detectors positioned as discussed above at each supply point of the brake pipe may be used to measure the flow of air from supply reservoirs into the brake pipe during the re-charging. The flow may be measured from the release of the brakes to the equalization of the system at the reference pressure (e.g., 90 psi or 620 kPa).

At 518, the flow for each sub-consist is integrated to provide a sub-consist measured replenishment volume for each of the sub-consists for re-charging the air brake system after the braking activity at 514. As discussed above, each lead powered unit of the sub-consists may include a processing unit or analysis module configured to receive air flow information from the air flow detectors of the particular sub-consist and determine the sub-consist measured replenishment volume using the air flow information from the air flow detectors associated with the particular sub-consist. For example, the analysis module may integrate the measured air flow over the time from release to equilibrium at the reference pressure (e.g., 90 psi or 620 kPa).

At 520, the plurality of sub-consist measured replenishment values are added together to provide a total measured replenishment volume. In some embodiments, each lead powered unit of the remote sub-consists of the consist provides the measured replenishment volume for that particular sub-consist to the lead powered unit of the lead consist. An analysis module disposed on-board the lead powered unit of the lead consist then adds the measured replenishment volumes for each remote sub-consist to the measured replenishment volume for the lead consist to provide a total replenishment volume for the consist corresponding to the re-charging of the air brake system after the braking activity of 514.

At 522, the total measured replenishment volume for the recharging corresponding to the braking activity of 514 is adjusted to account for leakage. For example, an estimated leakage volume may be subtracted from the total measured replenishment volume to provide a determined replenishment volume corresponding to the braking activity. The estimated leakage volume may be estimated from leakage monitored before the braking activity, after the braking activity, or a combination (such as an average) of leakage monitored before and after the braking activity. The determined replenishment volume for the braking activity may be compared to the determined replenishment volume for the initial test.

At 524, the determined replenishment volume corresponding to the braking activity is compared to the replenishment volume corresponding to the initial test. The comparison may be used to provide a brake effectiveness rating. The comparison may include determining a rating of the replenishment volume corresponding to the braking activity relative to the replenishment volume corresponding to the initial test. In some embodiments, the comparison includes determining a percentage of the replenishment volume corresponding to the braking activity relative to the replenishment volume corresponding to the initial test. For example, an air braking effectiveness (expressed as a percentage) may be described by the relationship $E_{air\ brake} = (V_{recent}/V_{initial}) \times 100\%$, where $E_{air\ brake}$ is the air brake effectiveness, $V_{recent}$ is the determined replenishment volume corresponding to the most recent air braking activity, and $V_{initial}$ is the determined replenishment volume corresponding to an initial test.

In other embodiments, other comparisons may be used to determine an effectiveness rating of an air brake system. For example, in some embodiments, one or more coefficients or parameters may be used in conjunction with a direct comparison such as $V_{recent}/V_{initial}$ to adjust the value of $E_{air\ brake}$ to account for changes in reference pressures and/or service application pressures, variances in the volume of the brake pipe relative to the volumes of the actuation reservoirs and/or brake cylinders, and the like. In some embodiments, the effectiveness rating may be based on experimentally determined calibrations, either expressed as a formula or as a look-up table. For example, replenishment volumes (and/or percentage or other comparisons of volumes) may be experimentally determined for a varying number (or percentage) of brakes disabled, and the particular volumes correlated to the corresponding number (or percentage) of brakes disabled by a look-up table. In some embodiments, measured or determined amounts other than or in addition to volume flow, such as mass flow, may be determined and compared to determine an effectiveness rating. Further additionally or alternatively, a comparison of one or more shapes of an air flow curve with a reference or characteristic curve may be used. For example, one or more slopes or other corresponding features of the air flow curve corresponding to the initial test and the air flow curve corresponding to the braking activity may be compared. Thus, in some embodiments, the brake effectiveness rating may equal $(V_{recent}/V_{initial}) \times 100\%$, while in other embodiments, the brake effectiveness rating may be proportional or otherwise correspond to $(V_{recent}/V_{initial}) \times 100\%$.

At 526, it is determined if the brake effectiveness satisfies a predetermined threshold. For example, certain U.S. federal regulations may require that 85% of the air brakes of an air brake system be operable for a mission to be allowed to continue. Thus, in some embodiments, the brake effectiveness rating or other measure of the percentage of air brakes operable may be compared to an 85% threshold. A recharging of the air brake system and corresponding determination of whether the effectiveness of the air brakes meets or exceeds the threshold may be performed periodically, for example, every 100, 250, 500, 750, or 1,000 miles or kilometers. In some embodiments, the satisfaction of the threshold and/or failure to satisfy the threshold may be logged or otherwise recorded. Further, the log or record may be provided or made available to a regulatory or other oversight system.

At 528, if the threshold is not satisfied, the failure to meet the threshold is indicated. An audible warning and/or a visual prompt, such as a textual prompt displayed on a screen, may be provided to an operator to alert the operator that the threshold of brake effectiveness was not met. The textual prompt may direct the operator to stop the train at the earliest possible opportunity for the performance of brake repair activities. The failure to meet the threshold may also be communicated to the control system 120, which may re-compute the trip plan accordingly. Further, the failure to meet the threshold may be communicated to a regulatory or oversight system, or as another example, to the scheduling system 110, which may in turn alter the schedule for one or more vehicles in a consist accordingly.

At 530, if the threshold is satisfied, the successful meeting of the threshold is indicated. An audible indication and/or a visual prompt, such as a textual prompt stating that the threshold is satisfied and/or displaying the rating of the air brake system's effectiveness may be provided to an operator and/or to an off-board system, such as a scheduling system or a regulatory system.

Thus, in embodiments, an air brake monitoring system is configured to collect information during a recharging of the air brake system, and determine an effectiveness rating such as a present braking capability based upon a comparison of the collected information (or information derived from the collected information) with information corresponding to a reference event, such as an initial test where all brakes were visually or otherwise confirmed as effective. Doing so provides for improved accuracy and convenience of determining if an air brake system is performing at an acceptable level.

In one embodiment, a system includes an air brake control module and an air brake monitoring module. The air brake control module is configured to be disposed on-board a vehicle, and to control variation of an amount of pressure in a brake pipe of the vehicle responsive to an input. The variation of the amount of pressure in the brake pipe is configured to actuate brakes of a braking system of the vehicle. The air brake monitoring module is configured to be disposed onboard the vehicle. The air brake monitoring module is configured to obtain a reference replenishment volume corresponding to a volume of air that recharges the braking system of the vehicle when a first amount of brakes are operational. The air brake monitoring module is also configured to obtain an actual replenishment volume corresponding to an actual volume of air used to recharge the braking system of the vehicle after a braking activity performed by the vehicle. The air brake monitoring module is further configured to generate a signal based on a comparison of the actual replenishment volume to the reference replenishment volume.

In another aspect, the air brake monitoring module is configured to generate the signal indicative of one or more of the brakes of the braking system malfunctioning when the actual replenishment volume is less than the reference replenishment volume.

In another aspect, the air brake monitoring module may be configured to receive air flow information from an air flow meter operably connected with the brake pipe of the vehicle. The air flow information corresponds to an air flow through the brake pipe of the vehicle. The air brake monitoring module may be configured to obtain the actual replenishment volume by performing an integration with respect to time of at least a portion of the air flow information.

In another aspect, the air brake monitoring module may be configured to obtain leakage information corresponding to a volume of air that leaks from the braking system during the recharge of the braking system, and the air brake monitoring module may be configured to generate the signal using the leakage information. Further, the air brake monitoring module may be configured to obtain the leakage information substantially continuously.

In another aspect, the air brake monitoring module is configured to obtain the reference replenishment volume using replenishment information corresponding to an amount of air used to recharge the braking system of the vehicle after a test application of the braking system prior to the braking activity from which the actual replenishment volume is obtained.

In another aspect, the air brake monitoring module may be operably connected with a vehicle control system of the vehicle. The vehicle control system may be configured to be disposed onboard the vehicle and to obtain a trip plan for the vehicle, with the trip plan based on at least one of one or more characteristics of a trip of the vehicle along a route in a transportation network, characteristics of the vehicle, or characteristics of the route along which the vehicle travels during the trip. The trip plan may designate at least one of one or more tractive operations or one or more braking operations of the vehicle during the trip. The trip plan may also include a designated air braking activity to be performed before a predetermined threshold distance traveled by the vehicle, and the air brake monitoring module may be configured to obtain the actual replenishment volume after performance of the designated air braking activity.

In another aspect, the vehicle may include a rail vehicle consist that includes a lead consist including a plurality of units including a lead consist lead powered unit and a remote consist including a plurality of units including a remote consist lead powered unit. The lead consist lead powered unit and the remote consist lead powered unit may include a respective air flow detectors including respective high precision mass flow meters. The lead consist lead powered unit may include a first air brake analysis module configured to determine a first volume of air corresponding to a first flow detected by the air flow detector of the lead consist lead powered unit, where the first volume corresponds to a recharging volume for the lead consist. Also, the remote consist lead powered unit may include a second air brake analysis module configured to determine a second volume of air corresponding to a second flow detected by the air flow detector of the remote consist lead powered unit, where the second volume corresponds to a recharging volume for the remote consist. The first air brake analysis module may be configured to determine a total consist volume using the first volume and the second volume.

In another aspect, the air brake monitoring module may be configured to determine an air brake effectiveness rating using the comparison of the actual replenishment volume to the reference replenishment volume. The signal may be indicative of the air brake effectiveness rating. In some embodiments, the air brake monitoring module may be configured to determine if the air brake effectiveness rating satisfies a threshold, and to provide at least one of a prompt or a warning to an operator if the threshold is not satisfied. In some embodiments, the air brake monitoring module may be operably connected with a vehicle control system of the vehicle, and the vehicle control system may be configured to control the vehicle based on the air brake effectiveness rating.

In another aspect, the first amount of brakes may correspond to the braking system being fully operational.

Another embodiment relates to a method that includes obtaining, at a processing unit disposed onboard a vehicle, a reference replenishment volume corresponding to a volume of air used to recharge a braking system of the vehicle if a first amount of brakes of the vehicle are operational. The method also includes obtaining, at the processing unit, an actual replenishment volume corresponding to an actual volume of air used to recharge the braking system of the vehicle after a braking activity performed by the vehicle. The actual replenishment volume corresponds to information obtained by one or more detection units disposed on-board the vehicle. The method further includes generating a signal, at the processing unit, based on a comparison of the reference replenishment volume and the actual replenishment volume.

In another embodiment of the method, the information obtained by the one or more detection units includes air flow information from an air flow meter operably connected with a brake pipe of the vehicle. The air flow information may correspond to an air flow through the brake pipe of the vehicle. Obtaining the actual replenishment volume may further include integrating at least a portion of the air flow information with respect to time.

In another embodiment of the method, the information obtained by the one or more detection units includes leakage information corresponding to a volume of air that leaks from the braking system. Obtaining the actual replenishment volume may include determining the actual replenishment volume using the leakage information. Further, the method may also include monitoring leakage from the braking system substantially continuously.

In another embodiment of the method, the step of obtaining the reference replenishment volume may include using measured replenishment information corresponding to an amount of air used to recharge the braking system of the vehicle after a test application of the braking system prior to the braking activity from which the actual replenishment volume is obtained.

In another embodiment of the method, the vehicle may include a vehicle control system configured to be disposed onboard a vehicle and to obtain a trip plan for the vehicle. The trip plan may be based on at least one of one or more characteristics of a trip of the vehicle along a route in a transportation network, characteristics of the vehicle, or characteristics of the route along which the vehicle travels during the trip. Further, the trip plan may designate at least one of one or more tractive operations or one or more braking operations of the vehicle during the trip. The trip plan may include a designated air braking activity to be performed before a predetermined threshold distance traveled by the vehicle, wherein the braking activity performed by the vehicle comprises the designated air braking activity.

In another embodiment of the method, the vehicle may include a plurality of consists, each consist comprising a corresponding consist lead powered unit. Obtaining the actual replenishment volume may include obtaining a plurality of consist replenishment volumes corresponding to the plurality of consists, and adding the plurality of consist replenishment volumes to provide the actual replenishment volume. The consist replenishment volumes may be determined using respective air flow information measured via one or more air flow meters disposed on-board each of the corresponding consist lead powered units.

In another embodiment of the method, the method may include determining, at the processing unit, an air brake effectiveness rating corresponding to the comparison of the reference replenishment volume and the actual replenishment volume. The signal that is generated may be indicative of the air brake effectiveness rating. In some embodiments, the method may further include determining if the air brake effectiveness rating satisfies a threshold, and providing at least one of a prompt or a warning to an operator if the threshold is not satisfied. In some embodiments, the method may include controlling the vehicle via a control module based on the air brake effectiveness rating.

In one embodiment, a tangible and non-transitory computer readable medium includes one or more computer software modules configured to direct a processor to obtain a reference replenishment volume corresponding to a volume of air used to recharge a braking system of a vehicle if a first amount brakes of the vehicle are operational. The computer readable medium is further configured to direct the processor to obtain an actual replenishment volume corresponding to an actual volume of air used to recharge the braking system of the vehicle after a braking activity performed by the vehicle. The actual replenishment volume corresponds to information obtained by one or more detection units disposed on-board the vehicle. The computer readable medium is further configured to direct the processor to generate a signal based on a comparison of the reference replenishment volume and the actual replenishment volume.

In another aspect, the information obtained by the one or more detection units may include air flow information from an air flow meter operably connected with a brake pipe of the vehicle, where the air flow information corresponds to an air flow through the brake pipe of the vehicle. The computer readable medium may be configured to direct the processor to obtain the actual replenishment volume using the air flow information. Further, the computer readable medium may be further configured to direct the processor to obtain the actual replenishment volume by integrating at least a portion of the air flow information with respect to time.

In another aspect, the information obtained by the one or more detection units may include leakage information corresponding to a volume of air that leaks from the braking system, and the computer readable medium may be further configured to direct the processor to use the leakage information to determine the actual replenishment volume. Further, the computer readable medium may be configured to direct the processor to monitor leakage from the braking system substantially continuously.

In another aspect, the computer readable medium may be further configured to direct the processor to obtain the reference replenishment volume using measured replenishment information corresponding to an amount of air used to recharge the braking system of the vehicle after a test application of the braking system prior to the braking activity from which the actual replenishment volume is obtained.

In another aspect, the vehicle may include a vehicle control system configured to be disposed onboard the vehicle and to obtain a trip plan for the vehicle, the trip plan based on at least one of one or more characteristics of a trip of the vehicle along a route in a transportation network, characteristics of the vehicle, or characteristics of the route along which the vehicle travels during the trip. The trip plan may designate at least one of one or more tractive operations or one or more braking operations of the vehicle during the trip. The trip plan may also include a designated air braking activity to be performed before a predetermined threshold distance traveled by the vehicle, wherein the braking activity performed by the vehicle includes the designated air braking activity.

In another aspect, the vehicle includes a plurality of consists, with each consist including a corresponding consist lead powered unit. The computer readable medium may be further configured to direct the processor to obtain the actual replenishment volume by obtaining a plurality of consist replenishment volumes corresponding to the plurality of consists and adding the plurality of consist replenishment volumes to provide the actual replenishment volume. Further, each consist replenishment volume may be determined using air flow information measured via one or more air flow meters disposed on-board each of the corresponding consist lead powered units.

In another aspect, the computer readable medium may be further configured to direct the processor to determine an air brake effectiveness rating corresponding to the comparison of the reference replenishment volume and the actual replenishment volume. The signal that is generated may be indicative of the air brake effectiveness rating. In some embodiments, the computer readable medium is further configured to direct the processor to determine if the air brake effectiveness rating satisfies a threshold, and to provide at least one of a prompt or a warning to an operator if the threshold is not satisfied. In some embodiments, the computer readable medium may be further configured to direct the processor to control the vehicle based on the air brake effectiveness rating.

In one embodiment, another system (e.g., for monitoring air brakes) includes an air brake control module, an air flow detector, and an air brake monitoring module. The air brake control module is disposed onboard the vehicle system. The air brake control module is configured to control variation of an amount of pressure in a brake pipe of the vehicle system responsive to an input or command, wherein the variation of the amount of pressure in the brake pipe is configured to actuate brakes of a braking system of the vehicle system. The air flow detector is disposed onboard the vehicle system and operably connected with the brake pipe of the vehicle system. The air flow detector is configured to measure air flow through the brake pipe. The air flow detector may include a high precision mass flow meter. The air brake monitoring module is configured to be disposed onboard the vehicle system. The air brake monitoring module is configured to obtain a reference replenishment volume corresponding to a volume of air used to recharge the braking system of the vehicle system when a first amount of brakes are operational, to obtain an actual replenishment volume corresponding to an actual volume of air used to recharge the braking system of the vehicle system after a braking activity performed by the vehicle system, and to generate a signal based on a comparison of the actual replenishment volume to the reference replenishment volume. The air brake monitoring module is configured to use air flow information provided by the air flow detector to obtain the actual replenishment volume.

In another aspect, the air brake monitoring module may be configured to determine an air brake effectiveness rating using the comparison of the actual replenishment volume to the reference replenishment volume, and the signal may be indicative of the air brake effectiveness rating. In some embodiments, the air brake monitoring module may be configured to determine if the air brake effectiveness rating satisfies a threshold, and to provide at least one of a prompt or a warning to an operator if the threshold is not satisfied. In some embodiments, the air brake monitoring module may be operably connected with a vehicle control system of the vehicle system, and the vehicle control system may be configured to control the vehicle based on the air brake effectiveness rating.

In another aspect, the first amount of brakes may correspond to the braking system being fully operational.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. An air brake monitoring system comprising:
an air brake control module configured to be disposed onboard a vehicle, the air brake control module configured to control variation of an amount of pressure in a brake pipe of the vehicle responsive to an input, wherein the variation of the amount of pressure in the brake pipe is configured to actuate brakes of a braking system of the vehicle; and
an air brake monitoring module configured to be disposed onboard the vehicle, the air brake monitoring module configured to obtain a reference replenishment volume corresponding to a volume of air that recharges the braking system of the vehicle after application of the brakes of the braking system when a first amount of brakes are operational, the air brake monitoring module configured to obtain an actual replenishment volume corresponding to an actual volume of air used to recharge the braking system of the vehicle after a braking activity performed by the vehicle, the air brake monitoring module also configured to generate a signal based on a comparison of the actual replenishment volume to the reference replenishment volume, wherein the air brake monitoring module is configured to determine an air brake effectiveness rating using the comparison of the actual replenishment volume to the reference replenishment volume, and wherein the signal is indicative of the air brake effectiveness rating.

2. The air brake monitoring system of claim 1, wherein the air brake monitoring module is configured to generate the signal indicative of one or more of the brakes of the braking system malfunctioning when the actual replenishment volume is less than the reference replenishment volume.

3. The air brake monitoring system of claim 1, wherein the air brake monitoring module is configured to receive air flow information from an air flow meter operably connected with the brake pipe of the vehicle, the air flow information corresponding to an air flow through the brake pipe of the vehicle.

4. The air brake monitoring system of claim 3, wherein the air brake monitoring module is configured to obtain the actual replenishment volume by performing an integration with respect to time of at least a portion of the air flow information.

5. The air brake monitoring system of claim 1, wherein the air brake monitoring module is configured to obtain leakage information corresponding to a volume of air that leaks from the braking system during the recharge of the braking system, and wherein the air brake monitoring module is configured to generate the signal using the leakage information.

6. The air brake monitoring system of claim 5, wherein the air brake monitoring module is configured to obtain the leakage information substantially continuously.

7. The air brake monitoring system of claim 1, wherein the air brake monitoring module is configured to obtain the reference replenishment volume using replenishment information corresponding to an amount of air used to recharge the braking system of the vehicle after a test application of the braking system prior to the braking activity from which the actual replenishment volume is obtained.

8. The air brake monitoring system of claim 1, wherein the air brake monitoring module is operably connected with a vehicle control system of the vehicle, wherein the vehicle control system is configured to be disposed onboard the vehicle and to obtain a trip plan for the vehicle, the trip plan based on at least one of one or more characteristics of a trip of the vehicle along a route in a transportation network, characteristics of the vehicle, or characteristics of the route along which the vehicle travels during the trip, the trip plan designating at least one of one or more tractive operations or one or more braking operations of the vehicle during the trip, wherein the trip plan includes a designated air braking activity to be performed before a predetermined threshold distance traveled by the vehicle, and wherein the air brake monitoring module is configured to obtain the actual replenishment volume after performance of the designated air braking activity.

9. The air brake monitoring system of claim 1, wherein the vehicle comprises a rail vehicle consist that comprises a lead consist comprising a plurality of units including a lead consist lead powered unit and a remote consist comprising a plurality of units including a remote consist lead powered unit, wherein the lead consist lead powered unit and the remote consist lead powered unit include respective air flow detectors comprising respective high precision mass flow meters, wherein the lead consist lead powered unit includes a first air brake analysis module configured to determine a first volume of air corresponding to a first flow detected by the air flow detector of the lead consist lead powered unit, the first volume corresponding to a recharging volume for the lead consist, wherein the remote consist lead powered unit includes a second air brake analysis module configured to determine a second volume of air corresponding to a second flow detected by the air flow detector of the remote consist lead powered unit, the second volume corresponding to a recharging volume for the remote consist, and wherein the first air brake analysis module is configured to determine a total consist volume using the first volume and the second volume.

10. The air brake monitoring system of claim 1, wherein the comparison of the actual replenishment volume to the reference replenishment volume signifies at least one of an amount of leakage of the braking system, a current braking capability relative to an original braking capability of the braking system, or a measure relative to 100% air brake effectiveness of the braking system.

11. The air brake monitoring system of claim 1, wherein the air brake monitoring module is configured to determine if the air brake effectiveness rating satisfies a threshold, and to provide at least one of a prompt or a warning to an operator if the threshold is not satisfied.

12. The air brake monitoring system of claim 1, wherein the air brake monitoring module is operably connected with a vehicle control system of the vehicle, wherein the vehicle control system is configured to control the vehicle based on the air brake effectiveness rating.

13. The air brake monitoring system of claim 1, wherein the first amount of brakes correspond to the braking system being fully operational.

14. A method comprising:
  obtaining, at a processing unit disposed on-board a vehicle, a reference replenishment volume corresponding to a volume of air used to recharge a braking system of the vehicle if a first amount of brakes of the vehicle are operational;
  obtaining, at the processing unit, an actual replenishment volume corresponding to an actual volume of air used to recharge the braking system of the vehicle after a braking activity performed by the vehicle, the actual replenishment volume corresponding to information obtained by one or more detection units disposed on-board the vehicle; and
  generating a signal, at the processing unit, based on a comparison of the reference replenishment volume and the actual replenishment volume; and
  determining, at the processing unit, an air brake effectiveness rating corresponding to the comparison of the reference replenishment volume and the actual replenishment volume, wherein the signal that is generated is indicative of the air brake effectiveness rating.

15. The method of claim 14, wherein the information obtained by the one or more detection units comprises air flow information from an air flow meter operably connected with a brake pipe of the vehicle, the air flow information corresponding to an air flow through the brake pipe of the vehicle.

16. The method of claim 15, wherein the step of obtaining the actual replenishment volume comprises integrating at least a portion of the air flow information with respect to time.

17. The method of claim 14, wherein the information obtained by the one or more detection units comprises leakage information corresponding to a volume of air that leaks from the braking system, and wherein obtaining the actual replenishment volume comprises determining the actual replenishment volume using the leakage information.

18. The method of claim 17, further comprising monitoring leakage from the braking system substantially continuously.

19. The method of claim 14, wherein the step of obtaining the reference replenishment volume comprises using measured replenishment information corresponding to an amount of air used to recharge the braking system of the vehicle after an initial test application of the braking system.

20. The method of claim 14, wherein the vehicle comprises a vehicle control system configured to be disposed onboard the vehicle and to obtain a trip plan for the vehicle, the trip plan based on at least one of one or more characteristics of a trip of the vehicle along a route in a transportation network, characteristics of the vehicle, or characteristics of the route along which the vehicle travels during the trip, the trip plan designating at least one of one or more tractive operations or one or more braking operations of the vehicle during the trip, wherein the trip plan includes a designated air braking activity to be performed before a predetermined threshold distance traveled by the vehicle, and wherein the braking activity performed by the vehicle comprises the designated air braking activity.

21. The method of claim 14, wherein the vehicle comprises a plurality of consists, each consist comprising a corresponding consist lead powered unit, and wherein obtaining the actual replenishment volume comprises obtaining a plurality of consist replenishment volumes corresponding to the plurality of consists, and adding the plurality of consist replenishment volumes to provide the actual replenishment volume.

22. The method of claim 21, wherein each consist replenishment volume is determined using respective air flow information measured via one or more air flow meters disposed on-board each of the corresponding consist lead powered units.

23. The method of claim 14 wherein the signal that is generated is indicative of at least one of an amount of leakage of the braking system, a current braking capability relative to an original braking capability of the braking system, or a measure relative to 100% air brake effectiveness of the braking system.

24. The method of claim 14, further comprising determining if the air brake effectiveness rating satisfies a threshold, and providing at least one of a prompt or a warning to an operator if the threshold is not satisfied.

25. The method of claim 14, further comprising controlling the vehicle via a control module based on the air brake effectiveness rating.

26. A tangible and non-transitory computer readable medium comprising one or more computer software modules configured to direct a processor to:
  obtain a reference replenishment volume corresponding to a volume of air used to recharge a braking system of a vehicle if a first amount of brakes of the vehicle are operational;
  obtain an actual replenishment volume corresponding to an actual volume of air used to recharge the braking system of the vehicle after a braking activity performed by the vehicle, the actual replenishment volume corresponding to information obtained by one or more detection units disposed on-board the vehicle; and
  generate a signal based on a comparison of the reference replenishment volume and the actual replenishment volume; and
  determine an air brake effectiveness rating corresponding to the comparison of the reference replenishment volume and the actual replenishment volume, wherein the signal that is generated is indicative of the air brake effectiveness rating.

27. The computer readable medium of claim 26, wherein the information obtained by the one or more detection units comprises air flow information from an air flow meter operably connected with a brake pipe of the vehicle, the air flow information corresponding to an air flow through the brake pipe of the vehicle, and wherein the computer readable medium is further configured to direct the processor to obtain the actual replenishment volume using the air flow information.

28. The computer readable medium of claim 27, wherein the computer readable medium is further configured to direct the processor to obtain the actual replenishment volume by integrating at least a portion of the air flow information with respect to time.

29. The computer readable medium of claim 26, wherein the information obtained by the one or more detection units comprises leakage information corresponding to a volume of air that leaks from the braking system, and wherein the computer readable medium is further configured to direct the processor to use the leakage information to determine the actual replenishment volume.

30. The computer readable medium of claim 29, wherein the computer readable medium is further configured to direct the processor to monitor leakage from the braking system substantially continuously.

31. The computer readable medium of claim 26, wherein the computer readable medium is further configured to direct the processor to obtain the reference replenishment volume using measured replenishment information corresponding to an amount of air used to recharge the braking system of the vehicle after a test application of the braking system prior to the braking activity from which the actual replenishment volume is obtained.

32. The computer readable medium of claim 26, wherein the vehicle comprises a vehicle control system configured to be disposed onboard the vehicle and to obtain a trip plan for the vehicle, the trip plan based on at least one of one or more characteristics of a trip of the vehicle along a route in a transportation network, characteristics of the vehicle, or characteristics of the route along which the vehicle travels during the trip, the trip plan designating at least one of one or more tractive operations or one or more braking operations of the vehicle during the trip, wherein the trip plan includes a designated air braking activity to be performed before a predetermined threshold distance traveled by the vehicle, and wherein the braking activity performed by the vehicle comprises the designated air braking activity.

33. The computer readable medium of claim 26, wherein the vehicle comprises a plurality of consists, each consist comprising a corresponding consist lead powered unit, and wherein the computer readable medium is further configured to direct the processor to obtain the actual replenishment volume by obtaining a plurality of consist replenishment volumes corresponding to the plurality of consists and adding the plurality of consist replenishment volumes to provide the actual replenishment volume.

34. The computer readable medium of claim 33, wherein each consist replenishment volume is determined using air flow information measured via one or more air flow meters disposed on-board each of the corresponding consist lead powered units.

35. The computer readable medium of claim 26, wherein the signal that is generated is indicative of at least one of an amount of leakage of the braking system, a current braking capability relative to an original braking capability of the braking system, or a measure relative to 100% air brake effectiveness of the braking system.

36. The computer readable medium of claim 26, wherein the computer readable medium is further configured to direct the processor to determine if the air brake effectiveness rating satisfies a threshold, and to provide at least one of a prompt or a warning to an operator if the threshold is not satisfied.

37. The computer readable medium of claim 26, wherein the computer readable medium is further configured to direct the processor to control the vehicle based on the air brake effectiveness rating.

38. A vehicle system comprising:
an air brake control module disposed onboard the vehicle system, the air brake control module configured to control variation of an amount of pressure in a brake pipe of the vehicle system responsive to an input or command, wherein the variation of the amount of pressure in the brake pipe is configured to actuate brakes of a braking system of the vehicle system;
an air flow detector disposed onboard the vehicle system and operably connected with the brake pipe of the vehicle system, the air flow detector configured to measure air flow through the brake pipe, the air flow detector comprising a high precision mass flow meter; and
an air brake monitoring module configured to be disposed onboard the vehicle system, the air brake monitoring module configured to obtain a reference replenishment volume corresponding to a volume of air that recharges the braking system of the vehicle system when a first amount of brakes are operational, to obtain an actual replenishment volume corresponding to an actual volume of air used to recharge the braking system of the vehicle system after a braking activity performed by the vehicle system, and to generate a signal based on a comparison of the actual replenishment volume to the reference replenishment volume, wherein the air brake monitoring module is configured to use air flow information provided by the air flow detector to obtain the actual replenishment volume, wherein the air brake monitoring module is configured to determine an air brake effectiveness rating using the comparison of the actual replenishment volume to the reference replenishment volume, and wherein the signal is indicative of the air brake effectiveness rating.

39. The vehicle system of claim 38, wherein the signal is indicative of at least one of an amount of leakage of the braking system, a current braking capability relative to an original braking capability of the braking system, or a measure relative to 100% air brake effectiveness of the braking system.

40. The vehicle system of claim 38, wherein the air brake monitoring module is configured to determine if the air brake effectiveness rating satisfies a threshold, and to provide at least one of a prompt or a warning to an operator if the threshold is not satisfied.

41. The vehicle system of claim 38, wherein the air brake monitoring module is operably connected with a vehicle control system of the vehicle system, wherein the vehicle control system is configured to control the vehicle based on the air brake effectiveness rating.

42. The vehicle system of claim 38, wherein the first amount of brakes correspond to the braking system being fully operational.

* * * * *

UNITED STATES PATENT AND TRADEMARK OFFICE
CERTIFICATE OF CORRECTION

PATENT NO.        : 8,880,314 B2                                    Page 1 of 1
APPLICATION NO.   : 13/676172
DATED             : November 4, 2014
INVENTOR(S)       : Peltz et al.

It is certified that error appears in the above-identified patent and that said Letters Patent is hereby corrected as shown below:

In the Specification

In Column 12, Line 53, delete "$t_o$," and insert -- $t_0$ --, therefor.

In Column 12, Line 54, delete "$t_o$," and insert -- $t_0$ --, therefor.

In Column 12, Line 57, delete "$(t_o)$" and insert -- $(t_0)$ --, therefor.

Signed and Sealed this
Second Day of June, 2015

Michelle K. Lee
*Director of the United States Patent and Trademark Office*